US012799933B2

(12) United States Patent
Nagura et al.

(10) Patent No.: US 12,799,933 B2
(45) Date of Patent: Nov. 17, 2026

(54) HYDROGEN GAS COMPRESSOR UNIT WITH SWITCHER AND SPILLBACK UNIT ARRANGEMENT

(71) Applicant: KOBE STEEL, LTD., Hyogo (JP)

(72) Inventors: Kenji Nagura, Takasago (JP); Kenji Kubo, Takasago (JP); Yugo Maeda, Takasago (JP)

(73) Assignee: KOBE STEEL, LTD., Hyogo (JP)

(*) Notice: Subject to any disclaimer, the term of this patent is extended or adjusted under 35 U.S.C. 154(b) by 0 days.

(21) Appl. No.: 19/151,347

(22) PCT Filed: Dec. 18, 2023

(86) PCT No.: PCT/JP2023/045382

§ 371 (c)(1),
(2) Date: Jul. 28, 2025

(87) PCT Pub. No.: WO2024/171604

PCT Pub. Date: Aug. 22, 2024

(65) Prior Publication Data

US 2026/0226891 A1 Aug. 6, 2026

(30) Foreign Application Priority Data

Feb. 15, 2023 (JP) ................................ 2023-021803

(51) Int. Cl.
*F04B 49/24* (2006.01)
*F04B 15/08* (2006.01)
(Continued)

(52) U.S. Cl.
CPC .............. *F04B 49/24* (2013.01); *F04B 25/00* (2013.01); *F04B 39/06* (2013.01);
(Continued)

(58) Field of Classification Search
CPC ................ F17C 7/02; F17C 2227/0157; F17C 2227/0164; F04B 49/22; F04B 49/24;
(Continued)

(56) References Cited

U.S. PATENT DOCUMENTS 5,520,000 A * 5/1996 Pevzner .................... F17C 7/02 62/48.1
9,494,281 B2 * 11/2016 Chalk ................... F04D 29/584
(Continued)

FOREIGN PATENT DOCUMENTS

CN 111322265 A * 6/2020 ......... F04D 27/0223
FR 3118484 A1 * 7/2022 .............. F04B 49/20
(Continued)

*Primary Examiner* — Nathan C Zollinger
(74) *Attorney, Agent, or Firm* — Studebaker Brackett PLLC

(57) ABSTRACT

A controller of a compressor unit controls a first switching means so that hydrogen gas is sent to a succeeding compression stage without passing through a cooler when temperature TS1 obtained by a first temperature sensor is below first threshold temperature T1. In such a case, suction temperature TS2 obtained by a second temperature sensor is referred to, and a spillback valve is controlled so that the suction temperature TS2 falls within a predetermined temperature range. The predetermined temperature range is set to a range higher than reference temperature based on liquefaction temperature of air and less than 0° C.

12 Claims, 22 Drawing Sheets

(51) Int. Cl.

| | |
|---|---|
| ***F04B 25/00*** | (2006.01) |
| ***F04B 39/06*** | (2006.01) |
| ***F04B 41/02*** | (2006.01) |
| ***F17C 7/00*** | (2006.01) |

(52) U.S. Cl.
CPC ....... *F04B 2015/0822* (2013.01); *F04B 41/02* (2013.01); *F04B 2205/112* (2013.01); *F17C 7/00* (2013.01)

(58) Field of Classification Search
CPC ........ F04B 25/00; F04B 39/06; F04B 39/041; F04B 2205/10; F04B 2205/112; F04B 2015/0822; F04B 41/02
See application file for complete search history.

(56) References Cited

U.S. PATENT DOCUMENTS

| | | | | |
|---|---|---|---|---|
| 10,655,784 | B2 * | 5/2020 | Fujisawa | F17C 9/04 |
| 2011/0103976 | A1 * | 5/2011 | Fejzuli | F04B 25/00 417/285 |
| 2022/0178360 | A1 | 6/2022 | Ukai et al. | |
| 2025/0314355 | A1 * | 10/2025 | Nagura | F04B 37/18 |

FOREIGN PATENT DOCUMENTS

| | | | |
|---|---|---|---|
| JP | H04-012178 | A | 1/1992 |
| JP | 2001-065795 | A | 3/2001 |
| JP | 2019-027590 | A | 2/2019 |
| JP | 7085079 | B1 | 6/2022 |

* cited by examiner

HYDROGEN GAS COMPRESSOR UNIT WITH SWITCHER AND SPILLBACK UNIT ARRANGEMENT

TECHNICAL FIELD

The present invention relates to a reciprocating compressor unit.

BACKGROUND ART

In recent years, in consideration of the environment, use of hydrogen for power generation, fuel for automobiles, and the like is considered, and demand for hydrogen is increasing. Further, low-temperature boil-off gas (BOG) such as liquefied natural gas (LNG) and liquid hydrogen (LH2) is recovered by a compressor and supplied to demand destinations such as an engine. In particular, boil-off gas generated from LH2 has extremely low temperature. For this reason, if a configuration in which the compressor directly sucks boil-off gas is employed, restrictions, such as it is necessary to select a material suitable for cryogenic temperature, employ design conditions that take into account the amount of thermal deformation, and implement strict heat insulation treatment, will be imposed.

In that connection, a problem as in Patent Literature 1 below is pointed out. "In recent years, hydrogen has attracted attention as a new energy source. Even in a case where hydrogen is used as an energy source, hydrogen is assumed to be in a liquefied state during storage and transportation like natural gas. However, hydrogen has a characteristic that its liquefaction temperature is lower than that of air. For this reason, when a facility such as a reciprocating compressor for natural gas or the like is directly applied to hydrogen, there is a possibility that a defect caused by cryogenic liquid hydrogen occurs. For example, liquefied air is generated around a device to which liquid hydrogen is supplied."

For this, Patent Literature 1 describes that "in this reciprocating compressor, a compression unit that compresses gas is housed in a container unit. Then, the container unit forms a vacuum region around the compression unit. Then, the compression unit is thermally insulated from an outer region by the vacuum region. That is, even in a case where cryogenic gas is provided to the compression unit, a surrounding region of the reciprocating compressor is not excessively cooled. Therefore, generation of liquefied air can be suppressed."

However, in general, for a moving machine that generates vibration during operation and a facility that requires regular maintenance through an inspection opening portion (for example, reciprocating compressor and the like), high-performance insulation is extremely difficult.

Patent Literatures 2 and 3 below propose a technique that uses a preheater to adjust temperature of suction gas for a screw compressor. Patent Literature 4 below discloses a reciprocating compressor and shows a heat exchanger that exchanges heat between boil-off gas before being suctioned into a compression unit and boil-off gas after being discharged from the compression unit. However, since this heat exchanger is intended for re-liquefaction of boil-off gas after being compressed in the compression unit, boil-off gas cooled by a cooler arranged downstream of the compression unit is led into the heat exchanger.

On the other hand, a problem below is pointed out in Patent Literature 5 below. "Conventionally, in a case where boil-off gas (BOG) evaporated in an LNG low-temperature storage tank is compressed by a low-temperature gas multi-stage compressor and supplied to a plant, temperature of the BOG tends to fluctuate widely from minus one hundred and several degrees Celsius to room temperature, and in particular, immediately after the start of the multi-stage compressor, suction side temperature rises close to room temperature, and if this is compressed as is, discharge temperature becomes equal to or higher than allowable temperature, and operation cannot be performed."

For liquefied hydrogen, the issue disclosed in Patent Literature 5 may become more serious due to its boiling point lower than that of LNG. A reciprocating compressor that handles boil-off gas of liquefied hydrogen needs to be adapted to a wide temperature range from a cryogenic state to room temperature.

CITATION LIST

Patent Literatures

Patent Literature 1: JP 2020-172870 A
Patent Literature 2: JP 7085079 B2
Patent Literature 3: JP 2001-65795 A
Patent Literature 4: JP 2019-27590 A
Patent Literature 5: JP H04-12178 A

SUMMARY OF INVENTION

An object of the present invention is to appropriately protect a constituent device of a reciprocating compressor unit that handles boil-off gas of liquefied hydrogen from wide temperature variation of boil-off gas.

A compressor unit according to one aspect of the present invention is a reciprocating compressor unit configured to recover hydrogen gas that is boil-off gas from a liquid hydrogen storage tank and supply at least a portion of the hydrogen gas to a demand destination that includes at least one of an engine, a power generation facility, and a boiler. Then, the compressor unit according to the present aspect includes a plurality of compression stages, a crank mechanism, a cooler, a first switching means, a spillback unit, a first temperature sensor, a second temperature sensor, and a controller.

A plurality of the compression stages compress hydrogen gas suctioned from a suction flow path. The crank mechanism drives a plurality of the compression stages. The cooler is provided in an intermediate flow path between a plurality of the compression stages. The first switching means switches an inflow state of hydrogen gas into the cooler. The spillback unit includes a spillback flow path and a spillback valve. The spillback flow path being for returning hydrogen gas after being discharged to a discharge flow path on the discharge side of a plurality of the compression stages or hydrogen gas flowing through the intermediate flow path to the suction flow path. The spillback valve is configured to adjust a spillback amount in the spillback flow path. The first temperature sensor is arranged in the intermediate flow path. The second temperature sensor is arranged on the suction flow path between a connection portion of the spillback flow path and a first compression stage as a foremost stage among a plurality of the compression stages. The controller controls each of the first switching means and the spillback valve.

In the compressor unit according to the present aspect, each of the first compression stage and succeeding compression stage excluding the first compression stage among a plurality of the compression stages includes a cylinder unit, a piston, a piston rod, and rod packing. The piston rod connects the piston to the crank mechanism. The rod packing seals between the piston rod and the cylinder unit.

The first compression stage is of an air cooling type and an oil free type.

The controller controls the first switching means and the spillback valve as described below.

The controller controls the first switching means to establish a first switching state in a case where temperature TS1 obtained by the first temperature sensor is equal to or more than a predetermined first temperature threshold T1 higher than 0° C. in time of startup. The first switching state is a state in which hydrogen gas discharged from the first compression stage flow through the cooler to be cooled.

The controller controls the first switching means to be in a second switching state in a case where temperature TS1 obtained by the first temperature sensor is less than the first temperature threshold T1. The second switching state is a state in which hydrogen gas is sent to a compression stage downstream of a portion where the cooler is provided without passing through the cooler.

The controller refers to suction temperature TS2 obtained by the second temperature sensor and controls the spillback valve such that the suction temperature TS2 falls within a predetermined temperature range in a case where the first switching means is in the second switching state.

In the compressor unit according to the present aspect, the predetermined temperature range is set to a range higher than reference temperature based on liquefaction temperature of air and less than 0° C.

DESCRIPTION OF EMBODIMENTS

An embodiment of the present invention will be described below with reference to the drawings. Note that an embodiment described below exemplarily illustrates the present invention, and the present invention is not limited to an embodiment below except for an essential configuration of the present invention.

First Embodiment

A compressor unit according to the present embodiment is a reciprocating compressor unit and is configured to recover hydrogen gas, which is boil-off gas, from a liquid hydrogen storage tank, compress the recovered hydrogen gas, and supply the compressed hydrogen gas to a demand destination. Temperature of boil-off gas, which is hydrogen gas, is about −253° C.

Figure 1:
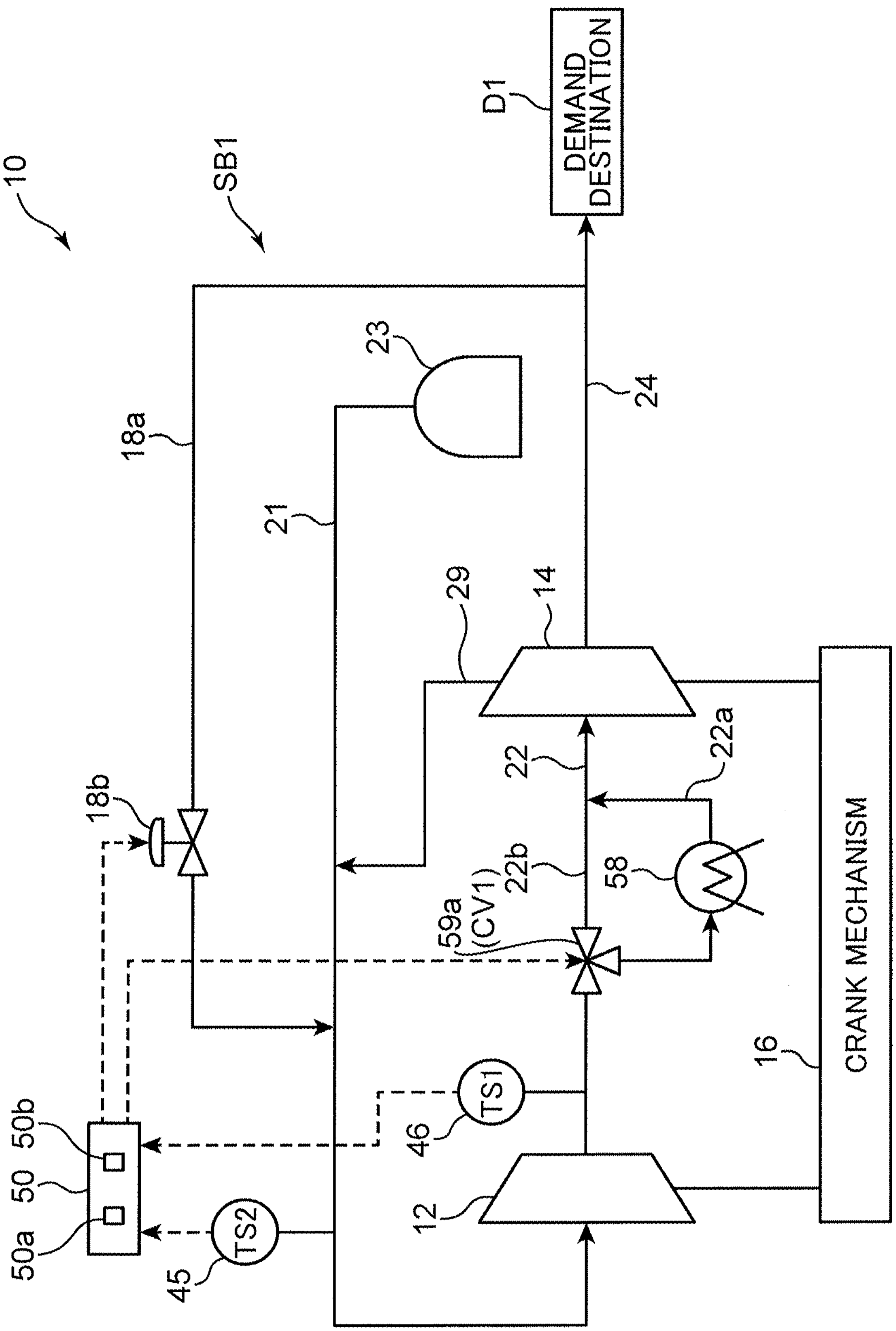
FIG. 1 is a diagram schematically illustrating a configuration of a compressor unit according to a first embodiment.

As illustrated in FIG. 1, a compressor unit 10 includes a plurality of compression stages (a first compression stage 12 and a succeeding compression stage 14) that compress hydrogen gas in a suction flow path 21, and a crank mechanism 16 that drives the first compression stage 12 and the succeeding compression stage 14.

The first compression stage 12 is connected to a liquid hydrogen storage tank 23 via the suction flow path 21. Therefore, boil-off gas that is liquefied gas generated inside the liquid hydrogen storage tank 23 is suctioned into the first compression stage 12 through the suction flow path 21.

Figure 2:
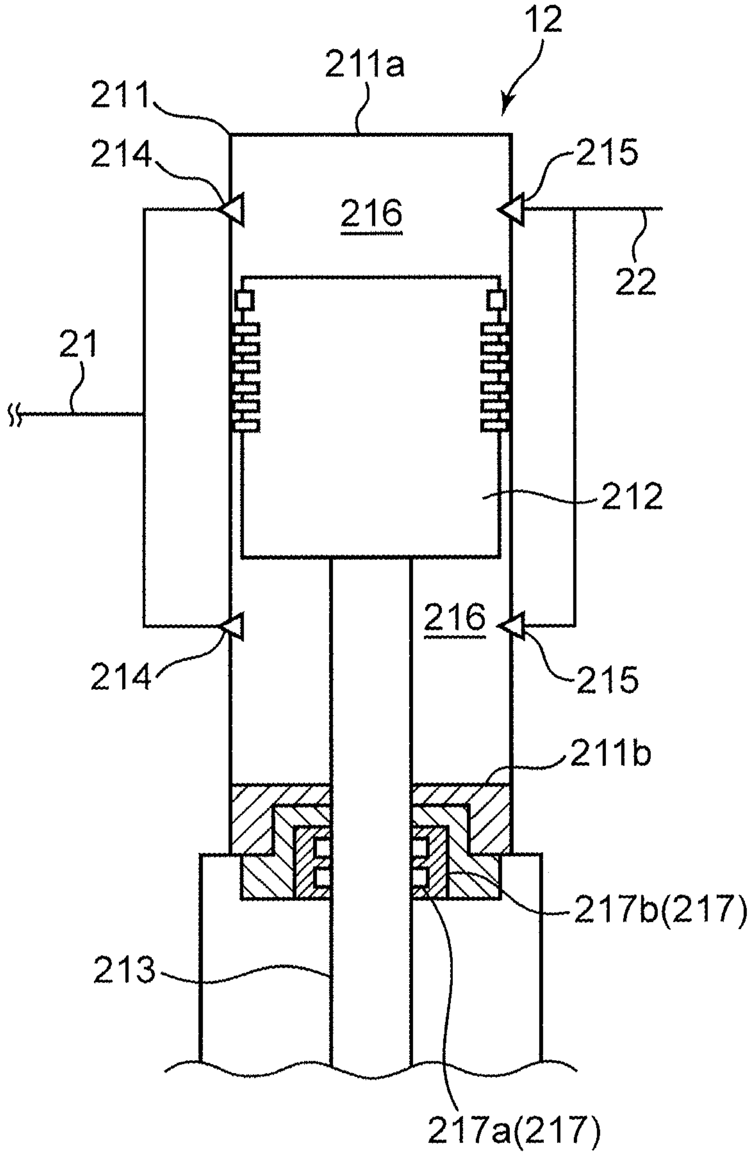
FIG. 2 is a diagram schematically illustrating a configuration of a first compression stage in the compressor unit.

The first compression stage 12 includes a reciprocating compression mechanism. As illustrated in FIG. 2, the first compression stage 12 includes a piston 212 arranged in a cylinder unit 211, a piston rod 213 connected to the piston 212, a pair of suction valves 214, and a pair of discharge valves 215. In the cylinder unit 211, a compression chamber 216 is formed between a front head 211*a* and the piston 212 and between a rear head 211*b* and the piston 212. The first compression stage 12 is of an air cooling type and is configured by an oil free compression mechanism that does not use lubricating oil.

The rear head 211*b* of the cylinder unit 211 is provided with rod packing 217 for preventing leakage of hydrogen gas from the compression chamber 216. The rod packing 217 is configured to seal between the piston rod 213 and the cylinder unit 211. The rod packing 217 includes a packing ring 217*a* arranged so as to surround the piston rod 213, and a case 217*b* that holds the packing ring 217*a*.

The piston 212 is connected to the crank mechanism 16 via the piston rod 213. By the piston 212 reciprocating inside the cylinder unit 211, hydrogen gas is compressed inside the compression chamber 216. FIG. 2 shows the first compression stage 12 having a double acting structure, but the first compression stage 12 may also employ a single acting structure.

Note that, in FIG. 1, the first compression stage 12 is indicated by one trapezoid for convenience, but the first compression stage 12 may have a plurality of the cylinder units 211. That is, the first compression stage 12 may be configured such that hydrogen gas is compressed and pressurized by a reciprocating motion of the piston 212 inside a plurality of the cylinder units 211 connected in parallel. Furthermore, a compression mechanism of a plurality of compression stages may be provided between the suction flow path 21 and an intermediate flow path 22. That is, the first compression stage 12 may be configured such that hydrogen gas is sequentially compressed and pressurized by the piston 212 inside a plurality of the cylinder units 211. The same applies to another embodiment described later.

The succeeding compression stage 14 is a compression mechanism connected to the first compression stage 12 via the intermediate flow path 22 for further compressing hydrogen gas discharged from the first compression stage 12. Hydrogen gas compressed by the succeeding compression stage 14 is discharged to a discharge flow path 24. Hydrogen gas flowing through the discharge flow path 24 is sent to a demand destination D1. Hydrogen gas discharged from the compressor unit does not necessarily need to be supplied directly to the demand destination D1, and for example, after being led into a cylinder or the like, the hydrogen gas may be supplied to the demand destination D1 through various means such as transportation of the cylinder or a gas piping connected to the cylinder. The high pressure demand destination D1 includes at least one of an engine, power generation facility, and boiler, but may additionally include, for example, a flare system, a vent, and the like that release gas into the atmosphere.

Figure 3:
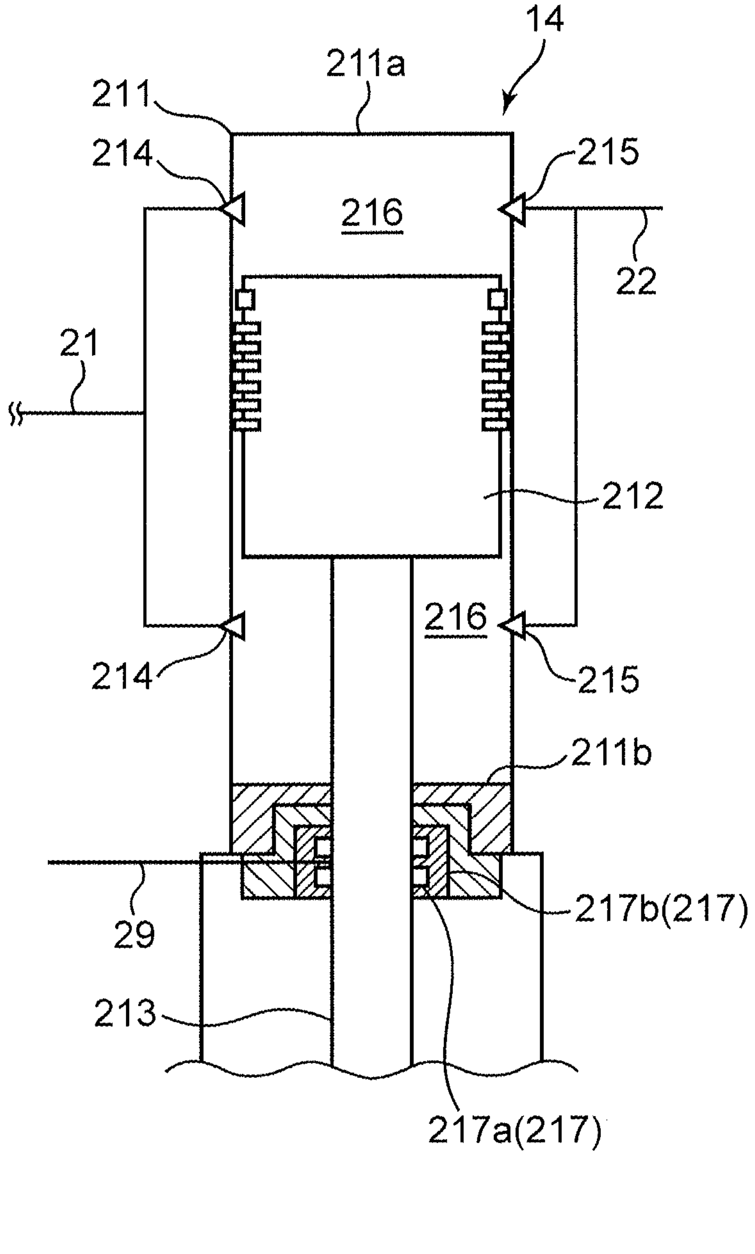
FIG. 3 is a diagram schematically illustrating a configuration of a succeeding compression stage in the compressor unit.

The succeeding compression stage 14 includes a reciprocating compression mechanism in a similar manner to the first compression stage 12 as illustrated in FIG. 3. The piston 212 of the succeeding compression stage 14 is also connected to the crank mechanism 16 via the piston rod 213. The succeeding compression stage 14 is further provided with a leak gas discharge unit 29 for returning leak gas from the rod packing 217 to the suction flow path 21. The leak gas discharge unit 29 may include a pipe member provided to connect the rod packing 217 and the suction flow path 21 to each other.

Note that FIG. 1 illustrates the succeeding compression stage 14 as a single trapezoid for convenience, but the succeeding compression stage 14 does not necessarily need to be a single stage and may include a compression mechanism of a plurality of compression stages. That is, the succeeding compression stage 14 may be configured such that hydrogen gas is sequentially compressed and pressurized by a reciprocating motion of the piston 212 inside a plurality of the cylinder units 211. The same applies to another embodiment. In the succeeding compression stage 14, a compression stage that discharges hydrogen gas at room temperature may be of either an oil free type or a lubricated type.

As illustrated in FIG. 1, the compressor unit 10 includes a spillback unit SB1 that returns a part of hydrogen gas discharged from the succeeding compression stage 14 to the discharge flow path 24 to the suction flow path 21. The spillback unit SB1 includes a spillback flow path 18*a* and a spillback valve 18*b* including a valve arranged in the spillback flow path 18*a* and having a valve with adjustable opening degree. One end of the spillback flow path 18*a* is connected to the discharge flow path 24, while another end is connected to the suction flow path 21. That is, hydrogen gas that flows through the spillback flow path 18*a* merges with hydrogen gas from the liquid hydrogen storage tank 23 in the suction flow path 21. The spillback valve 18*b* adjusts a spillback amount in the spillback flow path 18*a*.

The compressor unit 10 includes a cooler 58 arranged in the intermediate flow path 22 between the first compression stage 12 and the succeeding compression stage 14. The intermediate flow path 22 includes branched flow paths (a first flow path 22*a* and a second flow path 22*b*) at its intermediate portion, and the cooler 58 is arranged in one of the flow paths (the first flow path 22*a*).

A first switching means CV1 is provided at a branch point between the first flow path 22*a* and the second flow path 22*b* in the intermediate flow path 22. However, the first switching means CV1 may be provided in the first flow path 22*a* or may be provided in the second flow path 22*b*. In the present embodiment, the first switching means CV1 includes a three-way valve 59*a* as an example. The first switching means CV1 can switch a flow path of hydrogen gas between a first switching state and a second switching state. The first switching state is a state in which hydrogen gas discharged from the first compression stage 12 is circulated through the cooler 58, cooled, and allowed to flow into the succeeding compression stage 14. The second switching state is a state in which hydrogen gas discharged from the first compression stage 12 is caused to flow into the succeeding compression stage 14 without passing through the cooler 58. Note that, in the present embodiment, the first switching means CV1 including the three-way valve 59*a* is employed as an example, but the present invention is not limited to this. For example, it is also possible to employ an on-off valve capable of taking two positions of fully open and fully closed, an adjustment valve capable of adjusting a flow rate of hydrogen gas to the first flow path 22*a* and a flow rate of hydrogen gas to the second flow path 22*b*, and the like.

The compressor unit 10 includes an upstream temperature sensor (second temperature sensor) 45 and an intermediate temperature sensor (first temperature sensor) 46. The upstream temperature sensor 45 is a temperature sensor that detects temperature of hydrogen gas flowing through the suction flow path 21. The upstream temperature sensor 45 is arranged between a connection portion with the spillback flow path 18*a* and the first compression stage 12 in the suction flow path 21. Therefore, the upstream temperature sensor 45 can obtain temperature TS2 of hydrogen gas that is suctioned into the first compression stage 12 after hydrogen gas from the liquid hydrogen storage tank 23 merges with hydrogen gas from the spillback flow path 18*a* when hydrogen gas flows through the spillback flow path 18*a*.

The intermediate temperature sensor 46 is a temperature sensor that detects temperature of hydrogen gas flowing through the intermediate flow path 22. In the intermediate flow path 22, the intermediate temperature sensor 46 is arranged between the first compression stage 12 and a branch point between the first flow path 22*a* and the second flow path 22*b* in the intermediate flow path 22. Therefore, the intermediate temperature sensor 46 can obtain temperature of hydrogen gas flowing through the intermediate flow path 22.

Each of the upstream temperature sensor 45 and the intermediate temperature sensor 46 transmits obtained temperature information to a controller 50. The controller 50 includes a microprocessor including an MPU/CPU, ASIC, ROM, RAM, and the like, and controls various operations of the compressor unit 10 by executing firmware and the like stored in a memory in advance. Functions of the controller 50 include a first controller 50*a* and a second controller 50*b*. The first controller 50*a* is a functional unit configured to control a first switching means 59 with reference to temperature TS1 of hydrogen gas obtained by the intermediate temperature sensor 46. The second controller 50*b* is a functional unit configured to control the spillback valve 18*b* with reference to the temperature TS2 of hydrogen gas obtained by the upstream temperature sensor 45.

Figure 4:
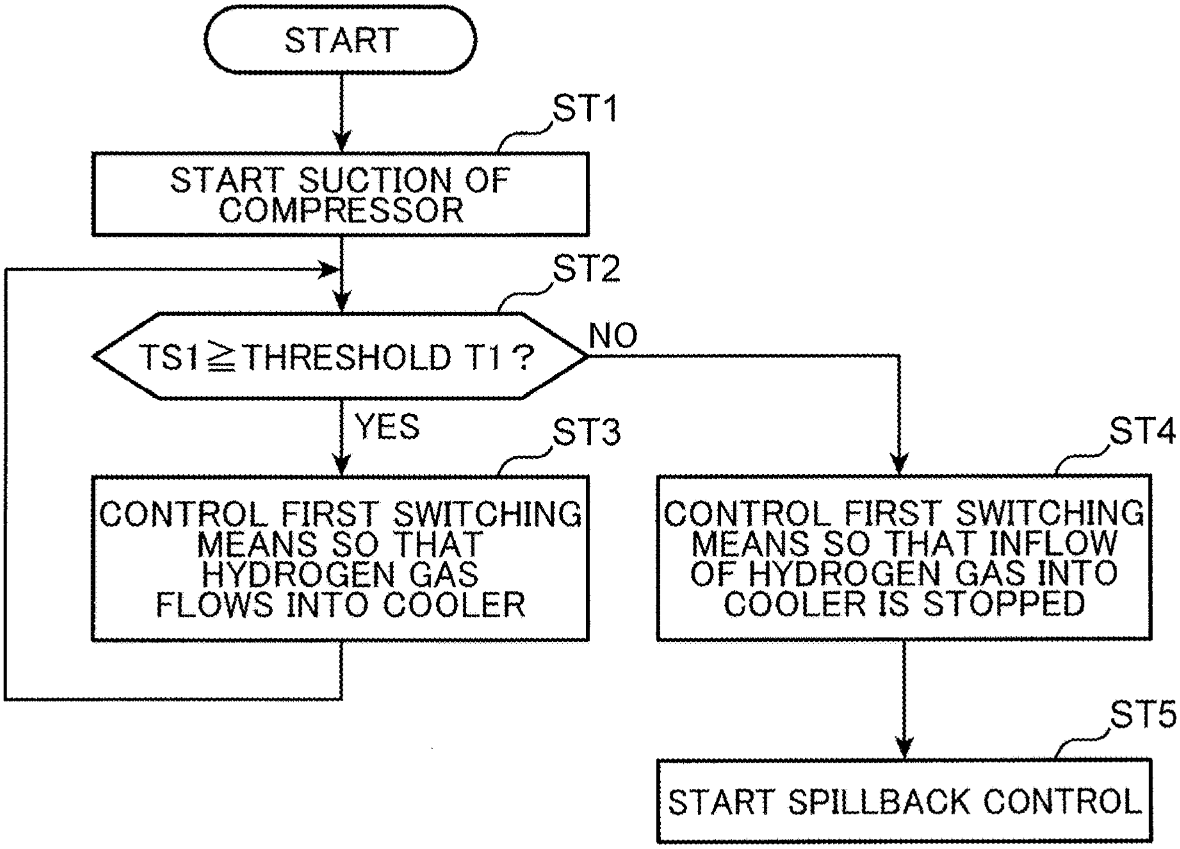
FIG. 4 is a flowchart showing operation control executed by a controller during operation of the compressor unit.

Here, operation control executed by the controller 50 in operation of the compressor unit 10 according to the present embodiment will be described with reference to FIG. 4.

The controller 50 determines whether the compressor unit 10 is already being driven, and determines the presence or absence of a start command in a case of determining that the compressor unit 10 is not being driven.

When a start command is issued to the compressor unit 10, the controller 50 operates the crank mechanism 16 to drive the first compression stage 12 and the succeeding compression stage 14 (step ST1). In the first compression stage 12 and the succeeding compression stage 14, the piston 212 reciprocates inside the cylinder unit 211 by operation of the crank mechanism 16. By this, hydrogen gas in the suction flow path 21 is suctioned into the first compression stage 12, hydrogen gas in the intermediate flow path 22 is suctioned into the succeeding compression stage 14, and compression of hydrogen gas is performed.

When the compressor unit 10 is started, the temperature TS1 of hydrogen gas (discharged from the first compression stage 12) flowing through the intermediate flow path 22 is obtained by the intermediate temperature sensor (first temperature sensor) 46. At this time, the controller 50 refers to the temperature TS1 and determines whether the temperature TS1 is equal to or more than a predetermined first temperature threshold T1 (step ST2). Here, the first temperature threshold T1 is temperature higher than 0° C.

In a case where the controller 50 determines YES (temperature TS1≥threshold T1) in step ST2, the first controller 50*a* controls the first switching means CV1 so that hydrogen gas discharged from the first compression stage 12 flows into the first flow path 22*a* (step ST3). By this, hydrogen gas discharged from the first compression stage 12 is cooled by the cooler 58 and sent to the succeeding compression stage 14 (first switching state).

On the other hand, in a case where the controller 50 determines NO (temperature TS1<threshold T1) in step ST2, the first controller 50*a* controls the first switching means CV1 such that hydrogen gas discharged from the first compression stage 12 flows to the second flow path 22*b* without passing through the first flow path 22*a* (step ST4). That is, the first controller 50*a* controls the first switching means CV1 so that inflow of hydrogen gas into the cooler 58 is stopped. By this, hydrogen gas discharged from the first compression stage 12 is sent to the succeeding compression stage 14 without passing through the cooler 58 (second switching state).

During driving of the compressor unit 10, temperature (suction temperature) TS2 of hydrogen gas that is suctioned into the first compression stage 12 is obtained by the upstream temperature sensor (second temperature sensor) 45. The controller 50 starts spillback control while referring to the suction temperature TS2 (step ST5). That is, in a case where temperature TS2<$T_{TH1}$, the second controller 50*b* controls the spillback valve 18*b* such that a part of gas in the discharge flow path 24 is returned to the suction flow path 21. By this, in a case where the first switching means CV1 is in the second switching state, hydrogen gas in the suction flow path 21 is heated such that the suction temperature TS2 falls within a predetermined temperature range ($T_{TH1}$≤temperature TS2≤$T_{TH2}$).

In more detail, when temperature TS2<$T_{TH1}$, the second controller 50*b* controls the spillback valve 18*b* such that a part of gas in the discharge flow path 24 is returned to the suction flow path 21, or an amount returned is increased. This ensures that the suction temperature TS2 is within the above temperature range. Note that in a case where temperature TS2>$T_{TH2}$, operation of returning a part of gas from the discharge flow path 24 to the suction flow path 21 is not performed, or an amount returned is reduced.

Here, the predetermined temperature range is set to a range higher than reference temperature based on liquefaction temperature of air and less than 0° C. That is, the lower limit value $T_{TH1}$ and the upper limit value $T_{TH2}$ of the predetermined temperature range are set within a range higher than the reference temperature and less than 0° C.

In a case where the second controller 50*b* sets the spillback valve 18*b* as described above (executes step ST5), hydrogen gas from the liquid hydrogen storage tank 23 is not directly led into the first compression stage 12, but the hydrogen gas with which hydrogen gas compressed by the succeeding compression stage 14 merges and has increased temperature is led into the first compression stage 12. For this reason, it is possible to prevent the first compression stage 12 from being exposed to hydrogen gas at cryogenic temperature (temperature less than $T_{TH1}$). Moreover, since the suction temperature TS2 is adjusted to be equal to or more than the lower limit temperature $T_{TH1}$, liquefaction of oxygen gas can also be prevented. Further, since the suction temperature TS2 is adjusted to be equal to or less than the upper limit temperature $T_{TH2}$, it is also possible to prevent density of hydrogen gas suctioned into the first compression stage 12 from excessively decreasing.

The compressor unit 10 having the above configuration is also protected under an environment in which hydrogen gas in the intermediate flow path 22 rises to a positive temperature region or under a low temperature environment in which hydrogen gas in the suction flow path 21 is less than the lower limit temperature $T_{TH1}$. Specifically, in a case where hydrogen gas in the intermediate flow path 22 of the compressor unit 10 rises to a positive temperature region, hydrogen gas discharged from the first compression stage 12 is cooled by the cooler 58, so that it is possible to prevent hydrogen gas whose temperature excessively rises from being sent to the succeeding compression stage 14. That is, the succeeding compression stage 14 can be protected. Further, in the compressor unit 10, hydrogen gas cooled by the cooler 58 is sent to the succeeding compression stage 14 even at the time of startup, so that startup can be quickly performed.

Further, in the compressor unit 10, in a case where the first switching means CV1 is in the second switching state, the suction temperature TS2 of hydrogen gas suctioned into the first compression stage 12 is adjusted to fall within the predetermined temperature range by hydrogen gas returned to the suction flow path 21 by the spillback unit SB1. For this reason, by setting temperature of hydrogen gas suctioned into the first compression stage 12 to be equal to or more than the lower limit temperature $T_{TH1}$, it is possible to avoid occurrence of liquefaction of oxygen gas as oxidizing gas.

Further, in the compressor unit 10, since the first compression stage 12 is of an oil free type, the risk of oil freezing can be avoided. Furthermore, in a plurality of compression stages, pressure becomes higher in each succeeding compression stage, and hydrogen gas becomes more likely to leak, but hydrogen gas leaking in the succeeding compression stage 14 is recovered into the suction flow path 21 by the leak gas discharge unit 29. For this reason, in the compressor unit 10, product loss (loss of hydrogen gas) at the time of compression can be reduced.

Furthermore, if the compressor unit 10 is employed, efficient recovery and supply of hydrogen gas is possible.

Figure 5:
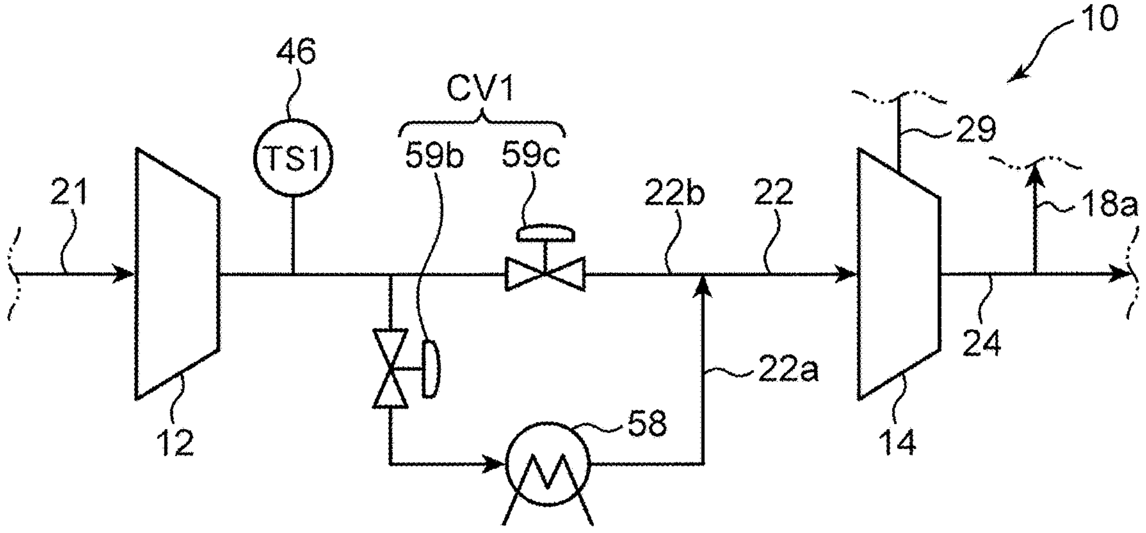
FIG. 5 is a diagram schematically illustrating a partial configuration of the compressor unit according to a variation of the first embodiment.

Note that, in the compressor unit 10 illustrated in FIG. 1, the three-way valve 59*a* is taken as an example of the first switching means CV1 that performs switching between the first flow path 22*a* and the second flow path 22*b* in the intermediate flow path 22, but a specific example of the first switching means CV1 is not limited to this. For example, as illustrated in FIG. 5, the first switching means CV1 including a first adjustment valve 59*b* provided with the first flow path 22*a* and a second adjustment valve 59*c* provided in the second flow path 22*b* may be constituted.

Figure 6:
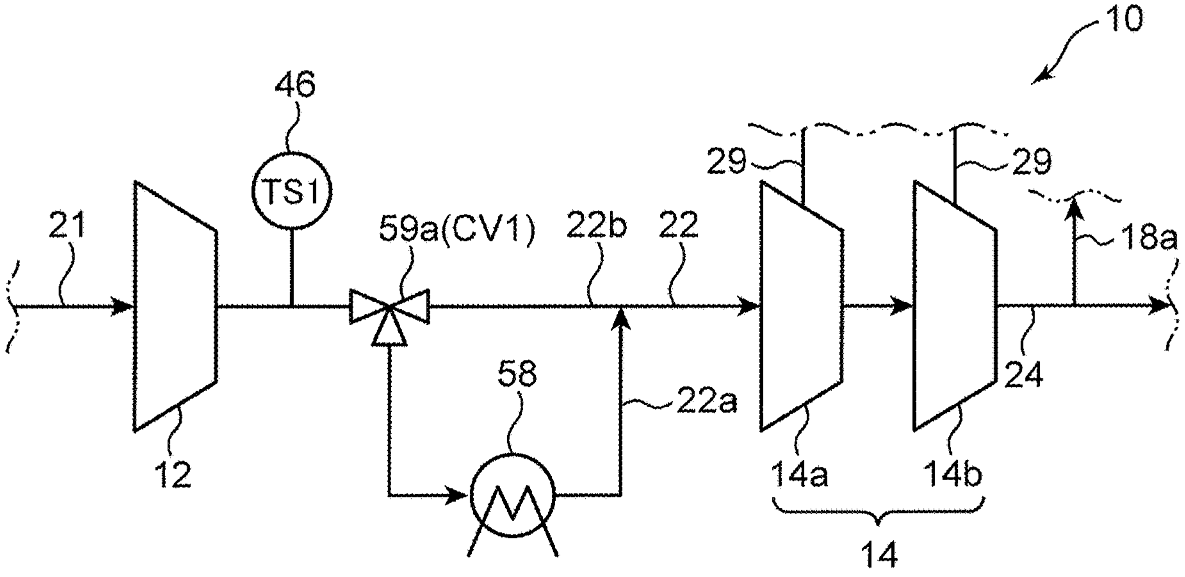
FIG. 6 is a diagram schematically illustrating a partial configuration of the compressor unit according to a variation of the first embodiment.
Figure 7:
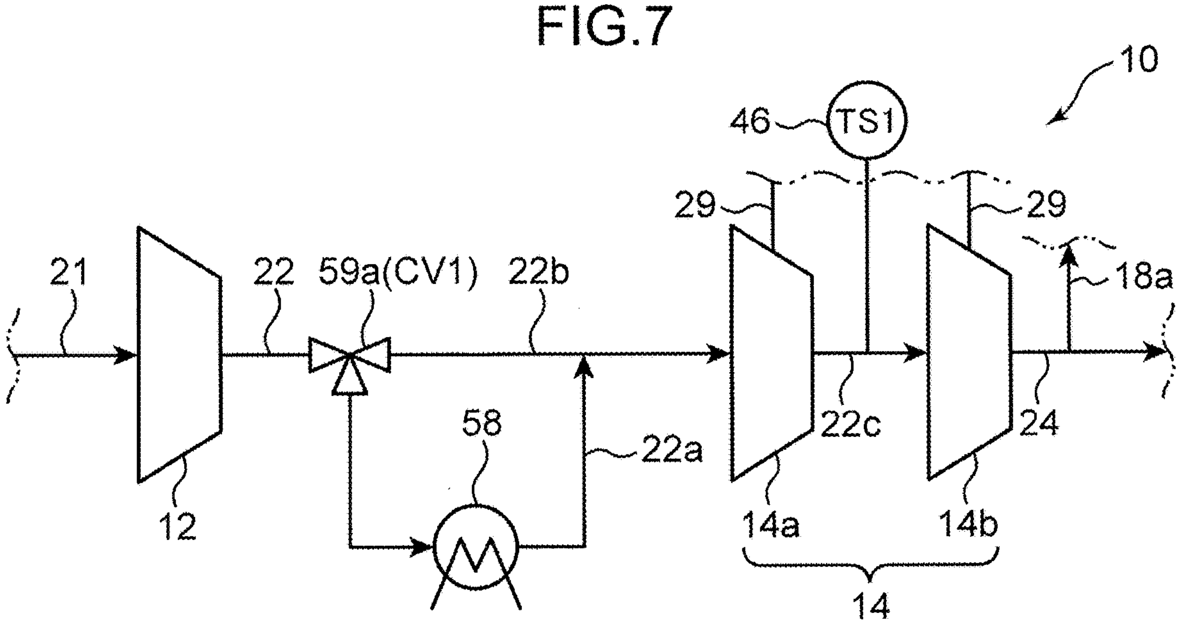
FIG. 7 is a diagram schematically illustrating a partial configuration of the compressor unit according to a variation of the first embodiment.

Further, in the compressor unit 10 illustrated in FIG. 1, the succeeding compression stage 14 includes a compression mechanism having one stage, but may include a compression mechanism having a plurality of stages. For example, as illustrated in FIG. 6, a succeeding first compression stage 14*a* and a succeeding second compression stage 14*b* may constitute the succeeding compression stage 14. Note that, in a case where this configuration is employed, for example, as illustrated in FIG. 7, the intermediate temperature sensor 46 may be arranged in a third flow path 22*c* between the succeeding first compression stage 14*a* and the succeeding second compression stage 14*b* in the intermediate flow path 22. In this case, temperature of hydrogen gas discharged from the first compression stage 12 can be estimated by the intermediate temperature sensor 46 arranged on the downstream side of the succeeding first compression stage 14*a*.

Figure 8:
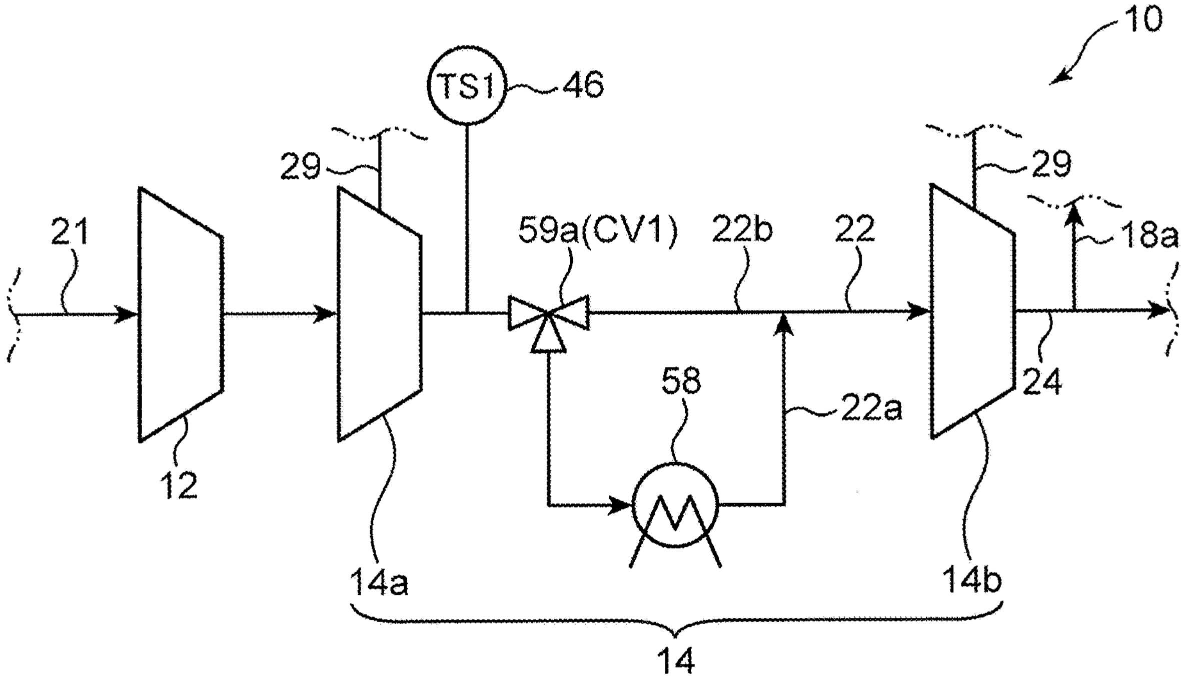
FIG. 8 is a diagram schematically illustrating a partial configuration of the compressor unit according to a variation of the first embodiment.

Further, in the compressor unit 10 illustrated in FIG. 1, the cooler 58 is arranged in the intermediate flow path 22 between the first compression stage 12 and the succeeding compression stage 14, but the position where the cooler 58 is arranged is not limited to this. For example, as illustrated in FIG. 8, a branched flow path (the first flow path 22*a* and the second flow path 22*b*) may be arranged in a portion between the succeeding first compression stage 14*a* and the succeeding second compression stage 14*b* of the succeeding compression stage 14 in the intermediate flow path 22, and the cooler 58 may be arranged in the first flow path 22*a*. Further, the form illustrated in FIG. 5 may be employed for the first switching means CV1.

Second Embodiment

Figure 9:
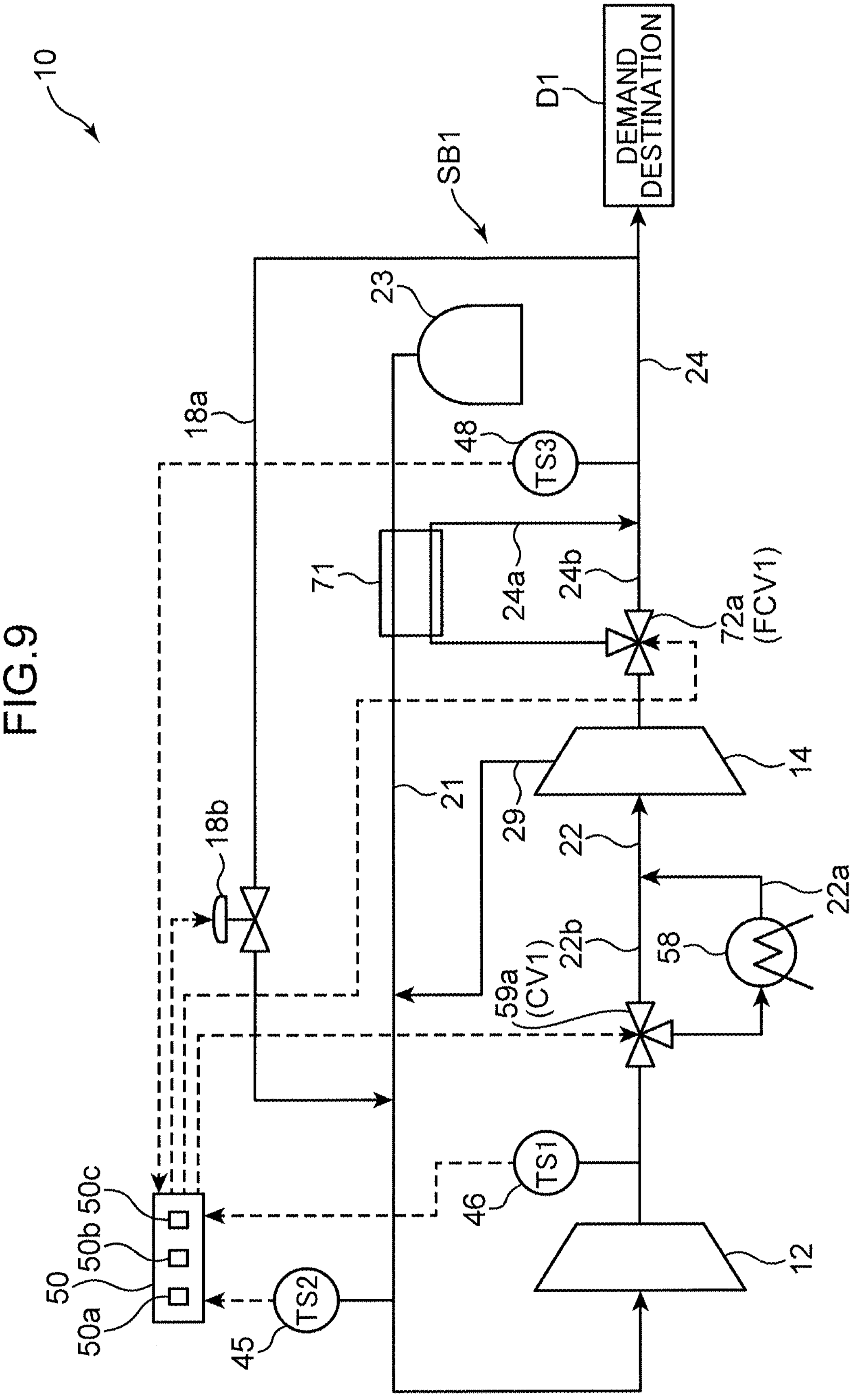
FIG. 9 is a diagram schematically illustrating a partial configuration of the compressor unit according to a second embodiment.

As illustrated in FIG. 9, the compressor unit 10 according to a second embodiment is different from that of the first embodiment in including a preheater 71. The preheater 71 is configured to enable heat exchange between hydrogen gas flowing through the suction flow path 21 (hydrogen gas suctioned into the first compression stage 12) and hydrogen gas after being discharged from the succeeding compression stage 14 to the discharge flow path 24. In FIG. 9, the same constituent element as in the first embodiment is denoted with the same reference sign, and description of an overlapping portion will be omitted below.

As illustrated in FIG. 9, the discharge flow path 24 has branched flow paths (a first flow path 24*a* and a second flow path 24*b*) at a portion on the upstream side of the position where the spillback flow path 18*a* is connected. The preheater 71 is arranged between one of the flow paths (first flow path 24*a*) and the suction flow path 21. This allows the preheater 71 to perform heat exchange between hydrogen gas flowing through the first flow path 24*a* of the discharge flow path 24 and hydrogen gas flowing through the suction flow path 21.

A flow rate adjusting means FCV1 is arranged at a branch point of the first flow path 24*a* and the second flow path 24*b* in the discharge flow path 24. However, the flow rate adjusting means FCV1 may be provided in the first flow path 24*a* or the second flow path 24*b*. The flow rate adjusting means FCV1 includes a three-way valve 72*a* as one example in the present embodiment. For this reason, in the present embodiment, it is possible to cause hydrogen gas discharged from the succeeding compression stage 14 to flow into one of the first flow path 24*a* and the second flow path 24*b*, and to adjust an amount of hydrogen gas flowing into the first flow path 24*a* while causing hydrogen gas to flow into both the first flow path 24*a* and the second flow path 24*b*.

The compressor unit 10 according to the present embodiment also includes a downstream temperature sensor (third temperature sensor) 48 arranged downstream of the preheater 71 in the discharge flow path 24. The downstream temperature sensor 48 can obtain temperature of hydrogen gas flowing through a portion downstream of the preheater 71 in the discharge flow path 24. Temperature information obtained by the downstream temperature sensor 48 is transmitted to the controller 50.

In the compressor unit 10, in addition to the first controller 50*a* and the second controller 50*b*, functions of the controller 50 include a third controller 50*c*. The third controller 50*c* is a functional unit configured to control the flow rate adjusting means FCV1 with reference to the temperature TS3 of hydrogen gas obtained by the downstream temperature sensor 48.

Figure 10:
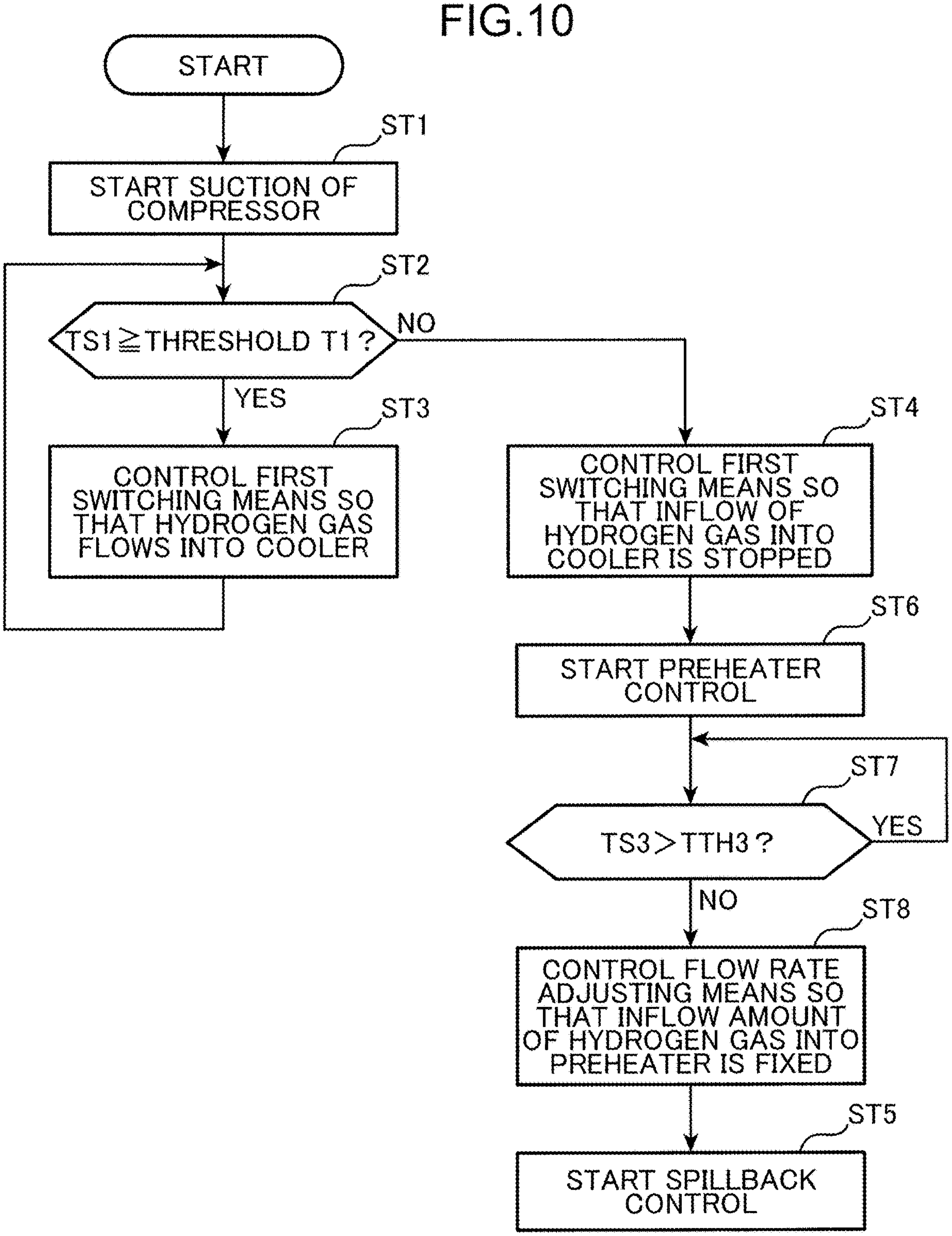
FIG. 10 is a flowchart showing operation control executed by the controller during operation of the compressor unit.

Here, operation control executed by the controller 50 in operation of the compressor unit 10 according to the present embodiment will be described with reference to FIG. 10. Note that in description below, description that overlaps with the above first embodiment will be partially omitted.

In a case where a steady operation state is reached (temperature TS1<threshold T1), the controller 50 controls the first switching means CV1 to stop inflow of hydrogen gas to the cooler 58 (step ST4). The control step so far is the same as that in the first embodiment.

The controller 50 starts preheater control while referring to the suction temperature TS2 obtained by the upstream temperature sensor 45 (step ST6). That is, in a case where temperature $TS2<T_{TH1}$, the third controller 50*c* controls the flow rate adjusting means FCV1 such that hydrogen gas discharged from the succeeding compression stage 14 flows into the first flow path 24*a* and passes through the preheater 71 (step ST6). Then, in a state where hydrogen gas passes through the preheater 71, the controller 50 determines whether the temperature TS3 obtained by the downstream temperature sensor 48 is higher than temperature $T_{TH3}$ (step ST7).

In a case where the controller 50 determines YES (temperature TS3>$T_{TH3}$) in step ST7, the third controller 50*c* continues a state in which hydrogen gas flows into the preheater 71. By this, heat exchange in the preheater 71 is continuously executed. Note that in a case where temperature TS2>$T_{TH2}$, preheater control is not performed.

On the other hand, in a case where the controller 50 determines NO (temperature TS3≤$T_{TH3}$) in step ST7, the flow rate adjusting means FCV1 is controlled to fix an inflow amount of hydrogen gas into the preheater 71 (step ST8), and then spillback control is started (step ST5). That is, the second controller 50*b* controls the spillback valve 18*b* such that a part of gas in the discharge flow path 24 is returned to the suction flow path 21. In this way, in a case where NO is determined in step ST7, in addition to the heating of hydrogen gas by the preheater 71, heating of hydrogen gas using the spillback unit SB1 is executed. By this, the suction temperature TS2 is adjusted to be equal to or more than the lower limit value $T_{TH1}$ of the predetermined temperature range.

In the compressor unit 10 having the above configuration, in a case where the first switching means CV1 is in the second switching state (in a case where the compressor unit 10 is in a steady operation state), heating of hydrogen gas in the suction flow path 21 by the preheater 71 is prioritized over heating by the spillback unit SB1. In addition, in the compressor unit 10, in a case where heating is insufficient, control for compensating by heating by the spillback unit SB1 is executed. Therefore, in the compressor unit 10 according to the present embodiment, loss of power for returning hydrogen gas compressed by the succeeding compression stage 14 to the suction flow path 21 can be minimized. This makes it possible to control temperature of hydrogen gas sent to the succeeding compression stage 14 within a certain range while suppressing a decrease in processing efficiency.

Further, in the compressor unit 10, the downstream temperature sensor 48 is arranged downstream of the preheater 71 in the discharge flow path 24. In the compressor unit 10, by controlling temperature of hydrogen gas on the downstream side of the preheater 71 by using the detected temperature TS3 obtained by the downstream temperature sensor 48, it is possible to suppress an excessive temperature decrease of hydrogen gas to be supplied to a demand destination. It is also possible to expect effects such as that it is not necessary to use an expensive cryogenic specification for a supply piping to a demand destination.

Furthermore, if the compressor unit 10 is employed, efficient recovery and supply of hydrogen gas is possible.

Figure 11:
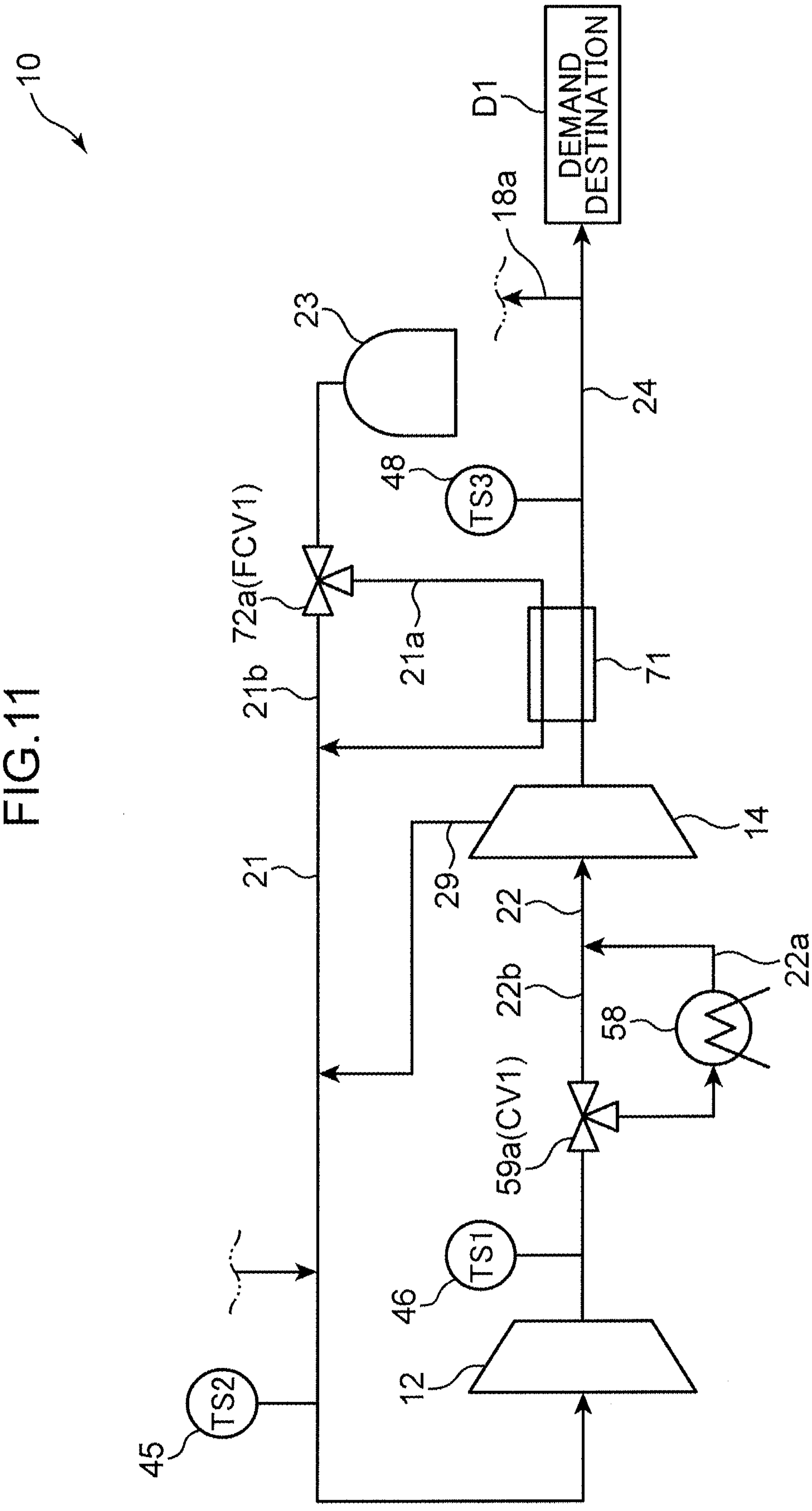
FIG. 11 is a diagram schematically illustrating a partial configuration of the compressor unit according to a variation of the second embodiment.

Note that the compressor unit 10 illustrated in FIG. 9 has, as one example, the configuration in which the discharge flow path 24 branches into the first flow path 24*a* and the second flow path 24*b* and the preheater 71 is arranged in the first flow path 24*a*, but an arrangement form of the preheater 71 is not limited to this example. For example, as illustrated in FIG. 11, the suction flow path 21 may be branched into a first flow path 21*a* and a second flow path 21*b*, and the preheater 71 may be arranged between one of the branched flow paths (first flow path 21*a*) and the discharge flow path 24. In this case, the flow rate adjusting means FCV1 that can adjust an amount of hydrogen gas flowing into the preheater 71 may be arranged at a branch point of the first flow path 21*a* and the second flow path 21*b* in the suction flow path 21.

Further, in the compressor unit 10 illustrated in FIG. 9, the configuration in which two compression stages, the first compression stage 12 and the succeeding compression stage 14, are included is described as an example, but the present invention is not limited to this. For example, one or more compression stages may be added between the succeeding compression stage 14 and the flow rate adjusting means FCV1. Similarly, in the compressor unit 10 illustrated in FIG. 11, one or more compression stages may be added between the succeeding compression stage 14 and the preheater 71.

Third Embodiment

Figure 12:
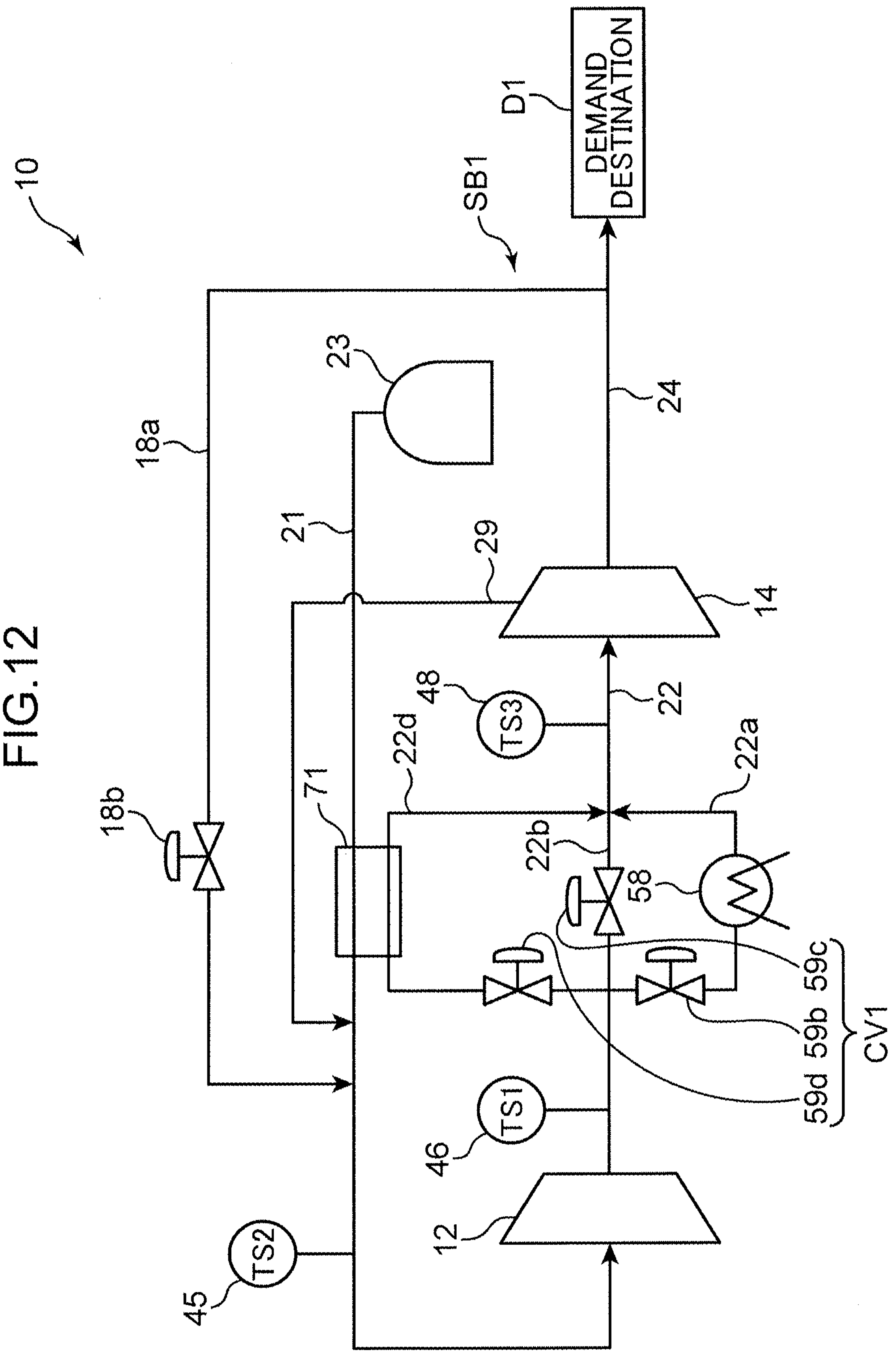
FIG. 12 is a diagram schematically illustrating a partial configuration of the compressor unit according to a third embodiment.

As illustrated in FIG. 12, the compressor unit 10 according to a third embodiment is different from that of the second embodiment in that the preheater 71 is arranged to enable heat exchange between hydrogen gases in the intermediate flow path 22 and the suction flow path 21. In FIG. 12, the same constituent element as that in the first embodiment and the second embodiment is denoted with the same reference sign, and description of an overlapping portion will be omitted below.

In the compressor unit 10, the intermediate flow path 22 includes a fourth flow path 22*d* in addition to the first flow path 22*a* and the second flow path 22*b*. The fourth flow path 22*d* is branched in the intermediate flow path 22 separately from the first flow path 22*a* and the second flow path 22*b*. In the compressor unit 10 according to the present embodiment, the preheater 71 is arranged between the fourth flow path 22*d* in the intermediate flow path 22 and the suction flow path 21.

The first switching means CV1 includes the first adjustment valve 59*b* arranged in the first flow path 22*a*, the second adjustment valve 59*c* arranged in the second flow path 22*b*, and a third adjustment valve 59*d* arranged in the fourth flow path 22*d*. Therefore, in the compressor unit 10, hydrogen gas discharged from the first compression stage 12 selectively flows to the first flow path 22*a*, the second flow path 22*b*, and the fourth flow path 22*d* under control of the first adjustment valve 59*b*, the second adjustment valve 59*c*, and the third adjustment valve 59*d*. Note that, in the present embodiment, each of the first flow path 22*a*, the second flow path 22*b*, and the fourth flow path 22*d* is arranged with the adjustment valves 59*b*, 59*c*, and 59*d*, but each may be arranged with an on-off valve that simply executes opening and closing.

Note that, although not illustrated, the first controller 50*a* (see FIG. 1 and the like) of the controller 50 is configured to enable control each of the first adjustment valve 59*b*, the second adjustment valve 59*c*, and the third adjustment valve 59*d* constituting the first switching means CV1.

In the compressor unit 10 according to the present embodiment, the downstream temperature sensor 48 is arranged downstream of the preheater 71 and the cooler 58 in the intermediate flow path 22.

In operation of the compressor unit 10 according to the present embodiment, the controller 50 executes control similar to that of the second embodiment. That is, control similar to that described with reference to FIG. 10 is executed.

The compressor unit 10 having the above configuration heats hydrogen gas flowing through the suction flow path 21 by using both heating by the preheater 71 and heating by the spillback unit SB1 in a case where the first switching means CV1 (the first adjustment valve 59*a*, the second adjustment valve 59*b*, and the third adjustment valve 59*d*) is in the second switching state. For this reason, in the compressor unit 10, loss of power for returning compressed hydrogen gas to the suction side of the first compression stage 12 can be minimized as compared with a case where hydrogen gas in the suction flow path 21 is heated only by the spillback unit SB1. Furthermore, in the compressor unit 10, since gas flowing through the fourth flow path 22*d* is cooled by the preheater 71, suction gas temperature of the succeeding compression stage 14 decreases. For this reason, power at the succeeding compression stage is also reduced. By these, it is possible to control the suction temperature TS2 of hydrogen gas into the first compression stage 12 within a certain range while suppressing decrease in processing efficiency.

Further, in the compressor unit 10, the downstream temperature sensor 48 is arranged downstream of the preheater 71 in the intermediate flow path 22, and temperature on the downstream side of the preheater 71 is controlled by using the detected temperature TS3 obtained by the downstream temperature sensor 48. By this, in the compressor unit 10, it is possible to prevent temperature of hydrogen gas suctioned into the succeeding compression stage 14 from being excessively decreased.

Furthermore, if the compressor unit 10 is employed, efficient recovery and supply of hydrogen gas is possible.

Figure 13:
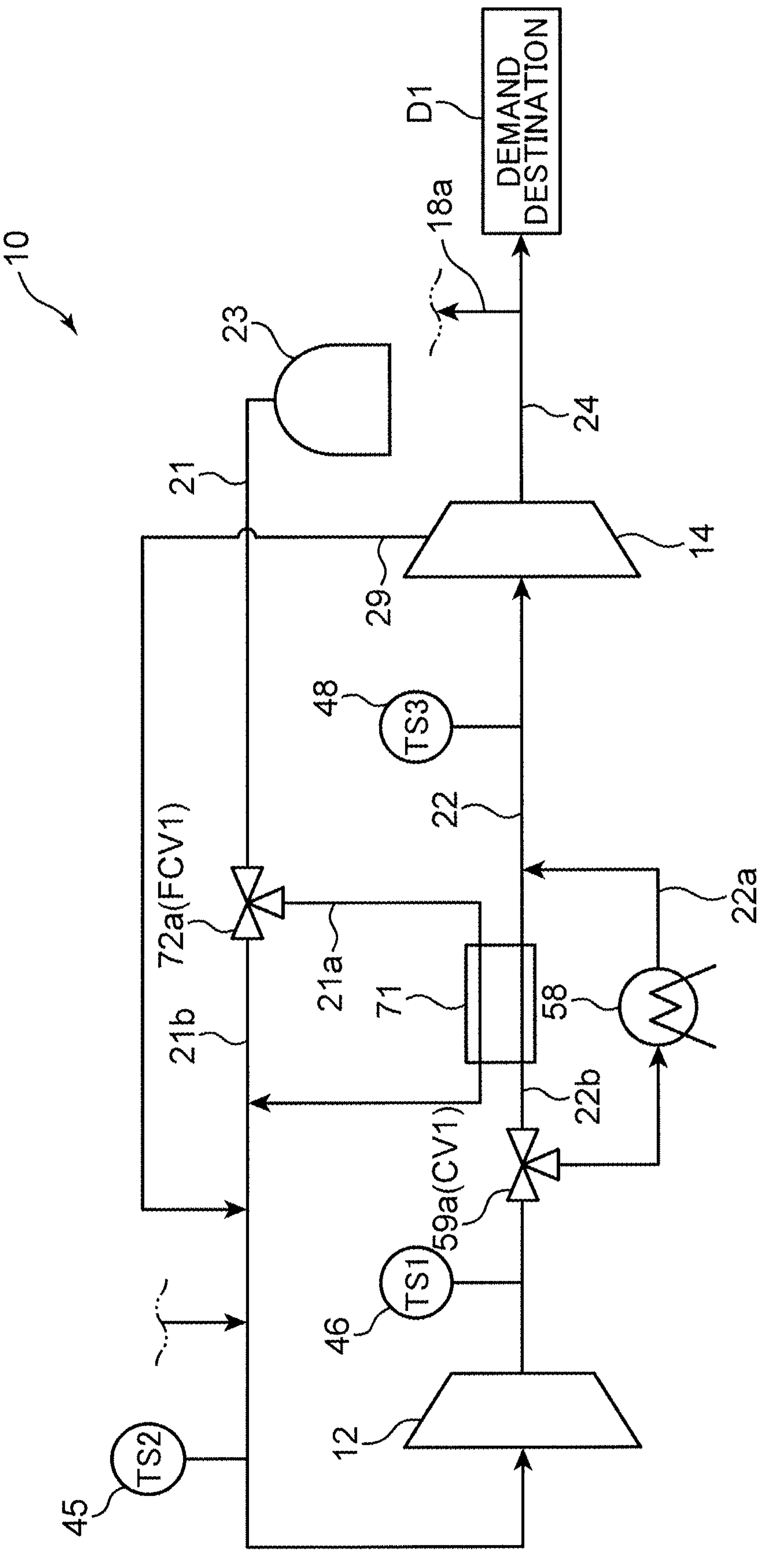
FIG. 13 is a diagram schematically illustrating a partial configuration of the compressor unit according to a variation of the third embodiment.

Note that, in the compressor unit 10 illustrated in FIG. 12, the configuration in which the fourth flow path 22*d* branching separately from the first flow path 22*a* and the second flow path 22*b* is arranged in the intermediate flow path 22 and the preheater 71 is arranged between the fourth flow path 22*d* and the suction flow path 21 is described as an example, but an arrangement form of the preheater 71 is not limited to this. For example, as illustrated in FIG. 13, the suction flow path 21 may be branched into the first flow path 21*a* and the second flow path 21*b*, and the preheater 71 may be arranged between one of the branched flow paths (the first flow path 21*a*) and the second flow path 22*b* of the intermediate flow path 22. In this case, a flow rate adjusting means 72 that can adjust an amount of hydrogen gas flowing into the preheater 71 may be provided at a branch point of the first flow path 21*a* and the second flow path 21*b* in the suction flow path 21.

Further, in the compressor unit 10 illustrated in FIG. 12, the configuration in which two compression stages, the first compression stage 12 and the succeeding compression stage 14, are included is described as an example, but the present invention is not limited to this. For example, one or more compression stages may be added between the succeeding compression stage 14 and a connection portion with the spillback flow path 18*a* in the discharge flow path 24.

Fourth Embodiment

Figure 14:
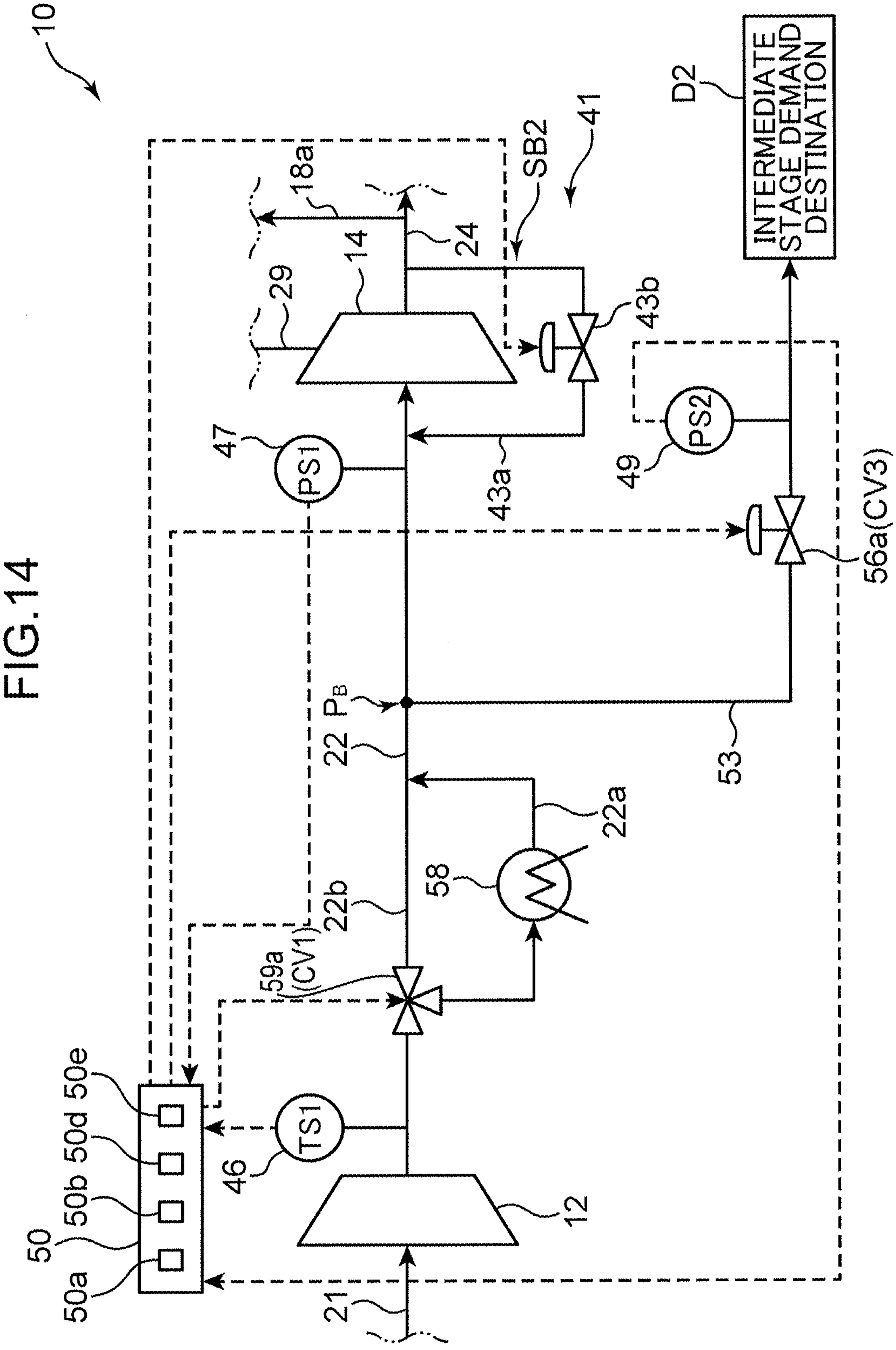
FIG. 14 is a diagram schematically illustrating a partial configuration of the compressor unit according to a fourth embodiment.

As illustrated in FIG. 14, the compressor unit 10 according to a fourth embodiment is different from that of the first embodiment in that a low pressure gas discharge path 53 and an adjusting means 41 are provided. The low pressure gas discharge path 53 is a flow path through which hydrogen gas can be discharged to an intermediate stage demand destination D2. The adjusting means 41 adjusts a processing amount of hydrogen gas by the succeeding compression stage 14. In FIG. 14, the same constituent element as in the first embodiment is denoted with the same reference sign, and description of an overlapping portion will be omitted below.

The intermediate stage demand destination D2 is a facility that can process hydrogen gas at pressure lower than pressure of hydrogen gas required by the demand destination D1. The intermediate stage demand destination D2 may include, for example, other than a facility that uses gas as an energy source, such as an engine, power generation facility, and boiler, a facility that uses gas at approximately atmospheric pressure such as a flare system and vent.

The low pressure gas discharge path 53 is branched at a branch point $P_B$ in the intermediate flow path 22. The branch point $P_B$ may be provided at any position of the intermediate flow path 22 including the first flow path 22*a* and the second flow path 22*b* as long as the position is between the first compression stage 12 and the succeeding compression stage 14.

Furthermore, a pressure sensor 47 is arranged in the intermediate flow path 22. The pressure sensor 47 obtains pressure PS1 of hydrogen gas in the intermediate flow path 22, and sends the obtained pressure information to the controller 50.

The compressor unit 10 includes a third switching means CV3 for switching a circulation state of hydrogen gas in the low pressure gas discharge path 53. The third switching means CV3 includes an on-off valve 56*a*, and is arranged in the low pressure gas discharge path 53 as one example in the present embodiment. In a case where the first switching means CV1 is in the second switching state, the third switching means CV3 mutually adjusts an amount of hydrogen gas sent to the succeeding compression stage 14 and an amount of hydrogen gas sent to the low pressure gas discharge path 53.

Note that the present embodiment employs the third switching means CV3 including the on-off valve 56*a*, but is not limited to this example. For example, it is also possible to employ the third switching means CV3 including a three-way valve or the like.

A pressure sensor 49 is arranged in a portion downstream of the third switching means CV3 in the low pressure gas discharge path 53. The pressure sensor 49 obtains pressure PS2 of hydrogen gas flowing through the low pressure gas discharge path 53 toward the intermediate stage demand destination D2, and sends the obtained pressure information to the controller 50.

The adjusting means 41 adjusts a processing amount of hydrogen gas by the succeeding compression stage 14 on the downstream side of the branch point $P_B$. The adjusting means 41 adjusts a gas processing amount by a method other than adjusting a rotation speed of the crank mechanism 16. In the present embodiment, as one example, a spillback unit (second spillback unit SB2), which adjusts a processing amount of hydrogen gas such that a gas flow rate sent from the succeeding compression stage 14 to a demand destination 26 is adjusted, constitutes the adjusting means 41.

The second spillback unit SB2 includes a second spillback flow path 43*a* and a second spillback valve 43*b* arranged in the second spillback flow path 43*a* and having adjustable opening degree. One end of the second spillback flow path 43*a* is connected to the discharge flow path 24 on the upstream side of the spillback flow path 18. Another end is connected to the intermediate flow path 22. Therefore, a portion of hydrogen gas discharged from the succeeding compression stage 14 is returned to the intermediate flow path 22, that is, the suction side of the succeeding compression stage 14. The second spillback valve 43*b* adjusts a spillback amount in the second spillback flow path 43*a*.

Information on a required amount of hydrogen gas is input from the demand destination D1 and the intermediate stage demand destination D2 to the controller 50. Then, functions of the controller 50 include a fourth controller 50*d* and a fifth controller 50*e* in addition to the first controller 50*a* and the second controller 50*b*. The fourth controller 50*d* is a functional unit configured to control the third switching means CV3 according to a change in a required amount of hydrogen gas input from the demand destination D1 or a required amount of hydrogen gas input from the intermediate stage demand destination D2. The fifth controller 50*e* is a functional unit configured to control the second spillback valve 43*b* according to a change in a required amount of hydrogen gas input from the demand destination D1 or a required amount of hydrogen gas input from the intermediate stage demand destination D2.

Figure 15:
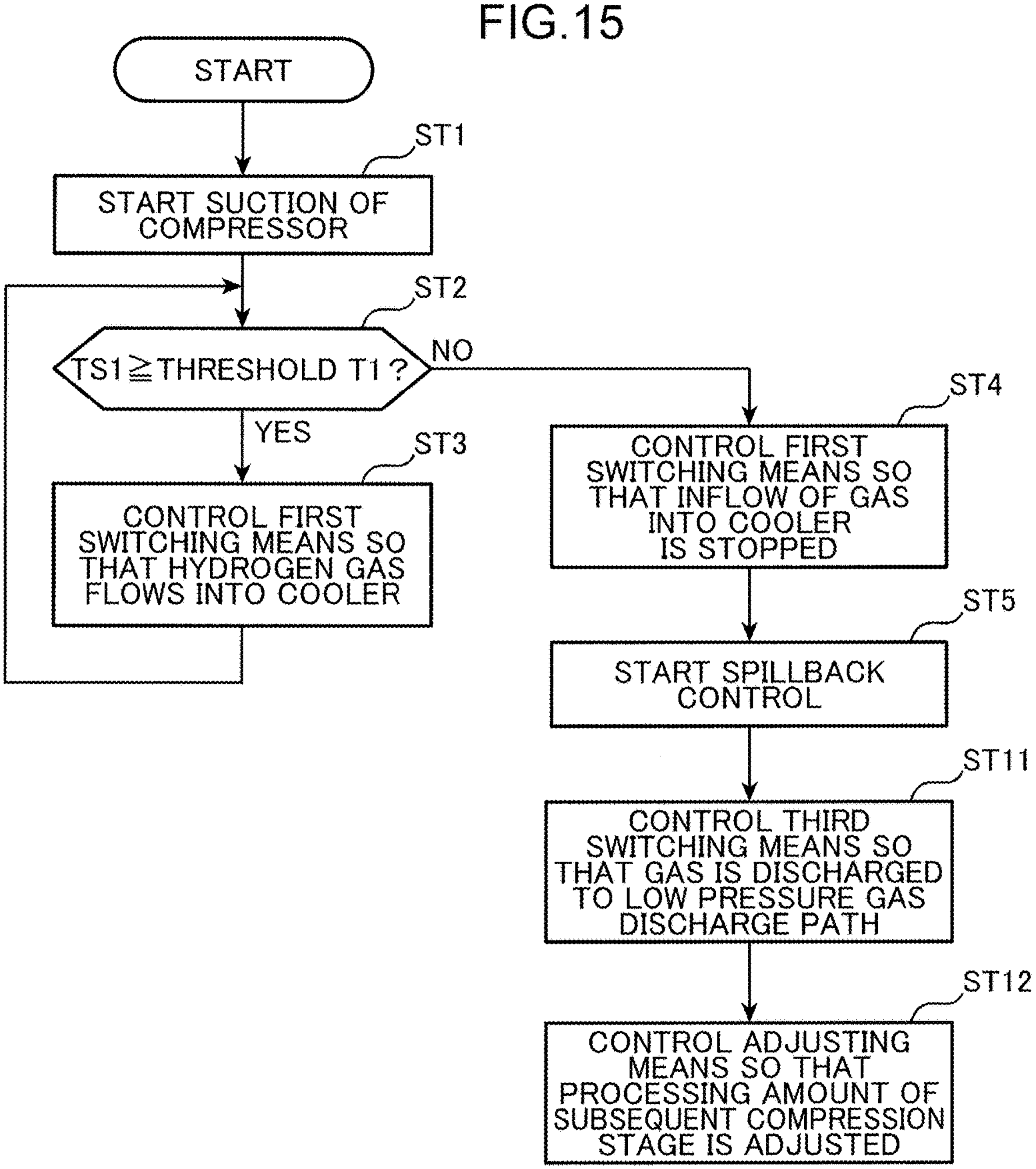
FIG. 15 is a flowchart showing operation control executed by the controller during operation of the compressor unit.

Here, operation control executed by the controller 50 in operation of the compressor unit 10 according to the present embodiment will be described with reference to FIG. 15. Note that in description below, description that overlaps with the above first embodiment will be partially omitted.

In a case where a steady operation state is reached (temperature TS1<threshold T1), the controller 50 controls the first switching means CV1 to stop inflow of hydrogen gas to the cooler 58 (step ST4). The control step so far is the same as that in the first embodiment.

The controller 50 starts spillback control while referring to the suction temperature TS2 obtained by the upstream temperature sensor 45 (step ST5). That is, in a case where temperature TS2<$T_{TH1}$, the first controller 50*a* controls the spillback valve 18*b* so that a part of hydrogen gas discharged from the succeeding compression stage 14 is returned to the suction flow path 21 (step ST5). By this, hydrogen gas in the suction flow path 21 is heated so that temperature (suction temperature TS2) of hydrogen gas flowing through the suction flow path 21 falls within the predetermined temperature range ($T_{TH1}$≤temperature TS2≤$T_{TH2}$). Note that in a case where temperature TS2>$T_{TH2}$, operation of returning a part of gas from the discharge flow path 24 to the suction flow path 21 is not performed, or an amount returned is reduced.

Further, in the present embodiment, in parallel with execution of step ST5, the controller 50 controls the third switching means CV3 so that hydrogen gas flowing through the intermediate flow path 22 is discharged to the intermediate stage demand destination D2 through the low pressure gas discharge path 53 (step ST11). Furthermore, in the present embodiment, the controller 50 controls the adjusting means 41 (second spillback valve 43*b*) such that a part of hydrogen gas discharged from the succeeding compression stage 14 is returned to the intermediate flow path 22 in parallel with execution of steps ST5 and ST11 (step ST12). Note that, as described above, control of the third switching means CV3 and the adjusting means 41 is executed according to a change in a request amount of hydrogen gas from the demand destination D1 and a request amount of hydrogen gas from the intermediate stage demand destination D2.

In the compressor unit 10 having the above configuration, during steady operation (in a case where the first switching means CV1 is in the second switching state), hydrogen gas is discharged to the intermediate stage demand destination D2 in a case where a necessary amount (required amount) of hydrogen gas at the demand destination D1 is reduced. By this, the compressor unit 10 can keep pressure in the liquid hydrogen storage tank 23 constant by balancing an amount of boil-off gas (hydrogen gas) generated from the liquid hydrogen storage tank 23 and an amount of hydrogen gas sent from the first compression stage 12.

Further, in the compressor unit 10, a processing amount of hydrogen gas in the succeeding compression stage 14 is reduced by the adjusting means 41 (second spillback unit SB2). By this, in the compressor unit 10, a compression ratio of the succeeding compression stage 14 is suppressed, and a processing amount of hydrogen gas in the succeeding compression stage 14 can be reduced. Therefore, in the compressor unit 10, power of the succeeding compression stage 14 can be reduced.

Furthermore, if the compressor unit 10 is employed, efficient recovery and supply of hydrogen gas is possible.

Figure 16:
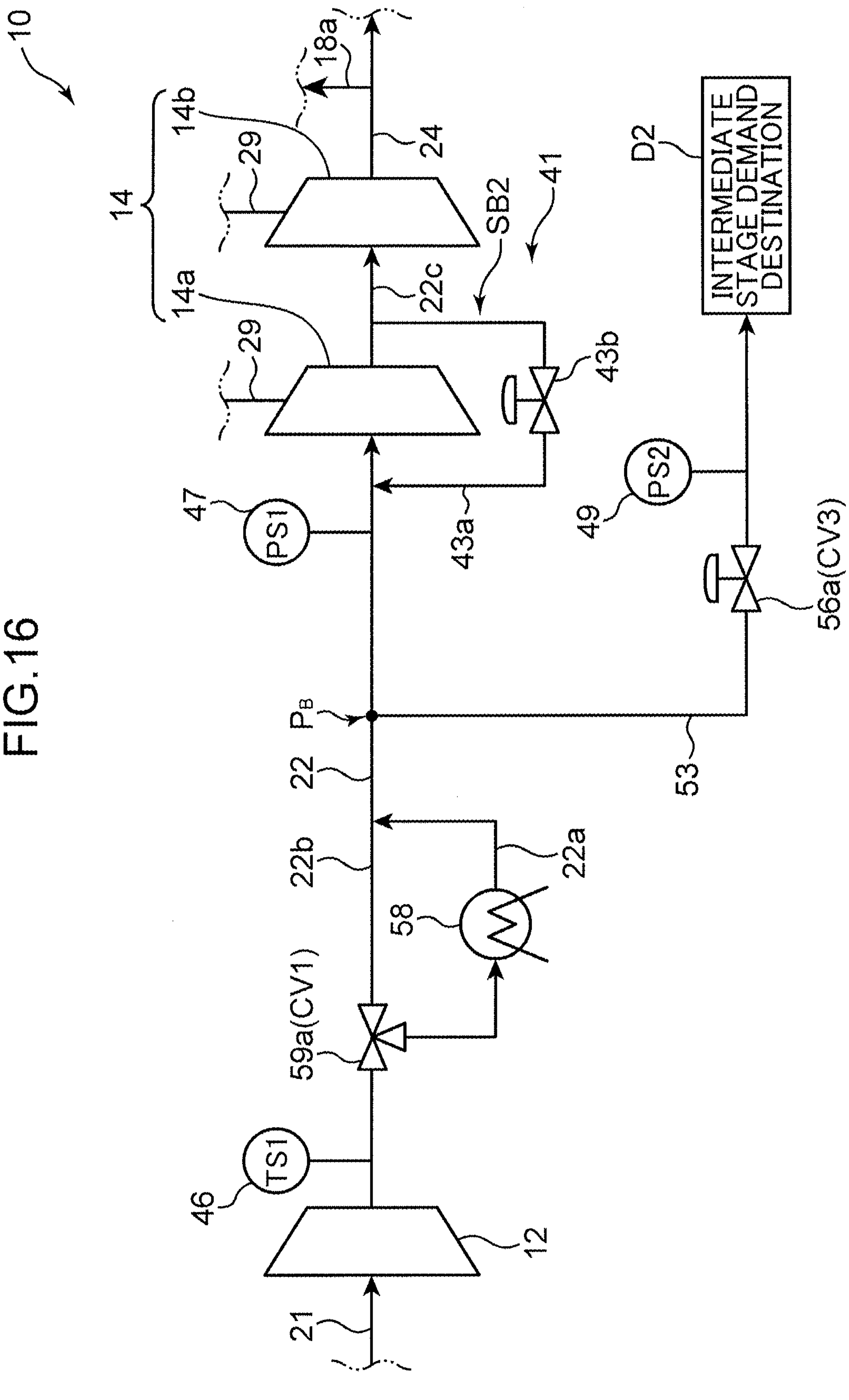
FIG. 16 is a diagram schematically illustrating a partial configuration of the compressor unit according to a variation of the fourth embodiment.

In the compressor unit 10 illustrated in FIG. 14, the succeeding compression stage 14 includes a compression mechanism having one stage, but the succeeding compression stage 14 may include a compression mechanism having a plurality of stages. For example, as illustrated in FIG. 16, the succeeding first compression stage 14*a* and the succeeding second compression stage 14*b* may constitute the succeeding compression stage 14. In a case where this configuration is employed, one end of the second spillback flow path 43*a* may be connected to the third flow path 22*c* between the succeeding first compression stage 14*a* and the succeeding second compression stage 14*b* in the intermediate flow path 22. In this case, a part of hydrogen gas discharged from the succeeding first compression stage 14*a* is returned to the suction side of the succeeding first compression stage 14*a*.

Figure 17:
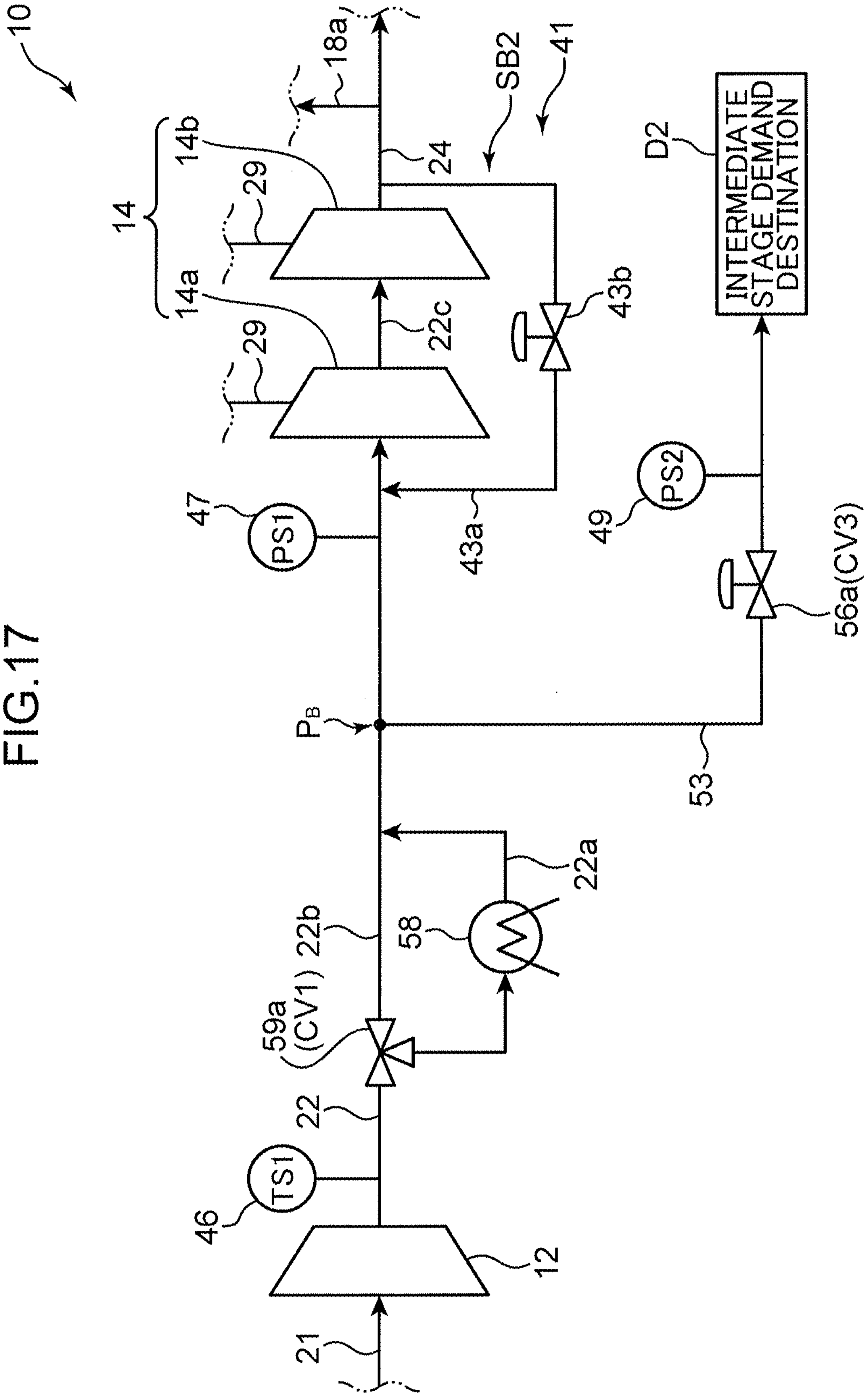
FIG. 17 is a diagram schematically illustrating a partial configuration of the compressor unit according to a variation of the fourth embodiment.

Further, in a case where the succeeding compression stage 14 includes the succeeding first compression stage 14*a* and the succeeding second compression stage 14*b*, as illustrated in FIG. 17, one end of the second spillback flow path 43*a* may be connected to the discharge flow path 24, and another end may be connected to a portion on the upstream side of the succeeding first compression stage 14*a* in the intermediate flow path 22. In this case, a part of hydrogen gas discharged from the succeeding second compression stage 14*b* is returned to the suction side of the succeeding first compression stage 14*a*.

Figure 18:
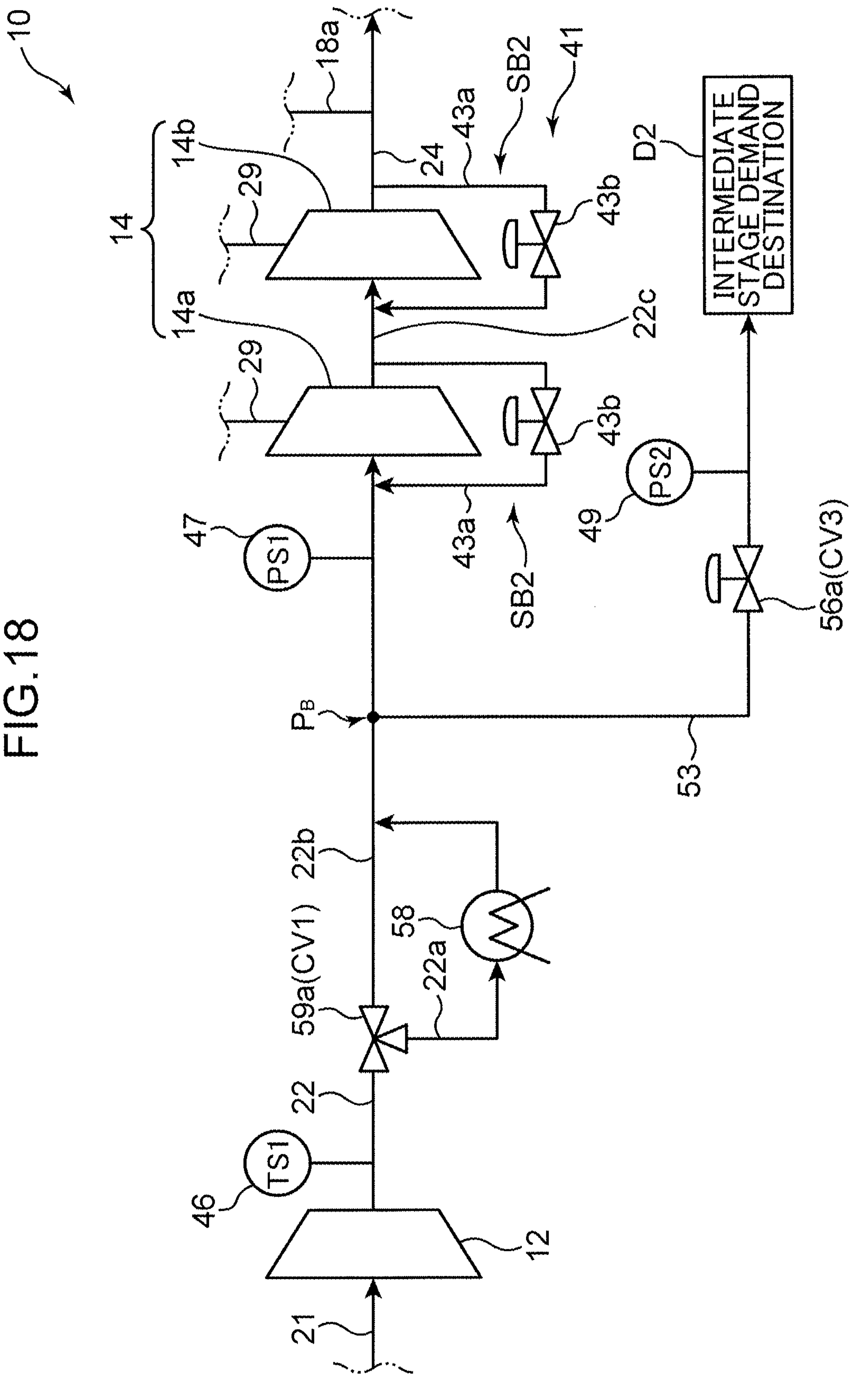
FIG. 18 is a diagram schematically illustrating a partial configuration of the compressor unit according to a variation of the fourth embodiment.

Further, in a case where the succeeding compression stage 14 includes the succeeding first compression stage 14*a* and the succeeding second compression stage 14*b*, as illustrated in FIG. 18, the second spillback unit SB2 may be provided for each of the succeeding first compression stage 14*a* and the succeeding second compression stage 14*b*. In this case, a part of hydrogen gas discharged from the succeeding first compression stage 14*a* to the third flow path 22*c* is returned to the suction side of the succeeding first compression stage 14*a*, and a part of hydrogen gas discharged from the succeeding second compression stage 14*b* to the discharge flow path 24 is returned to the third flow path 22*c*.

Figure 19:
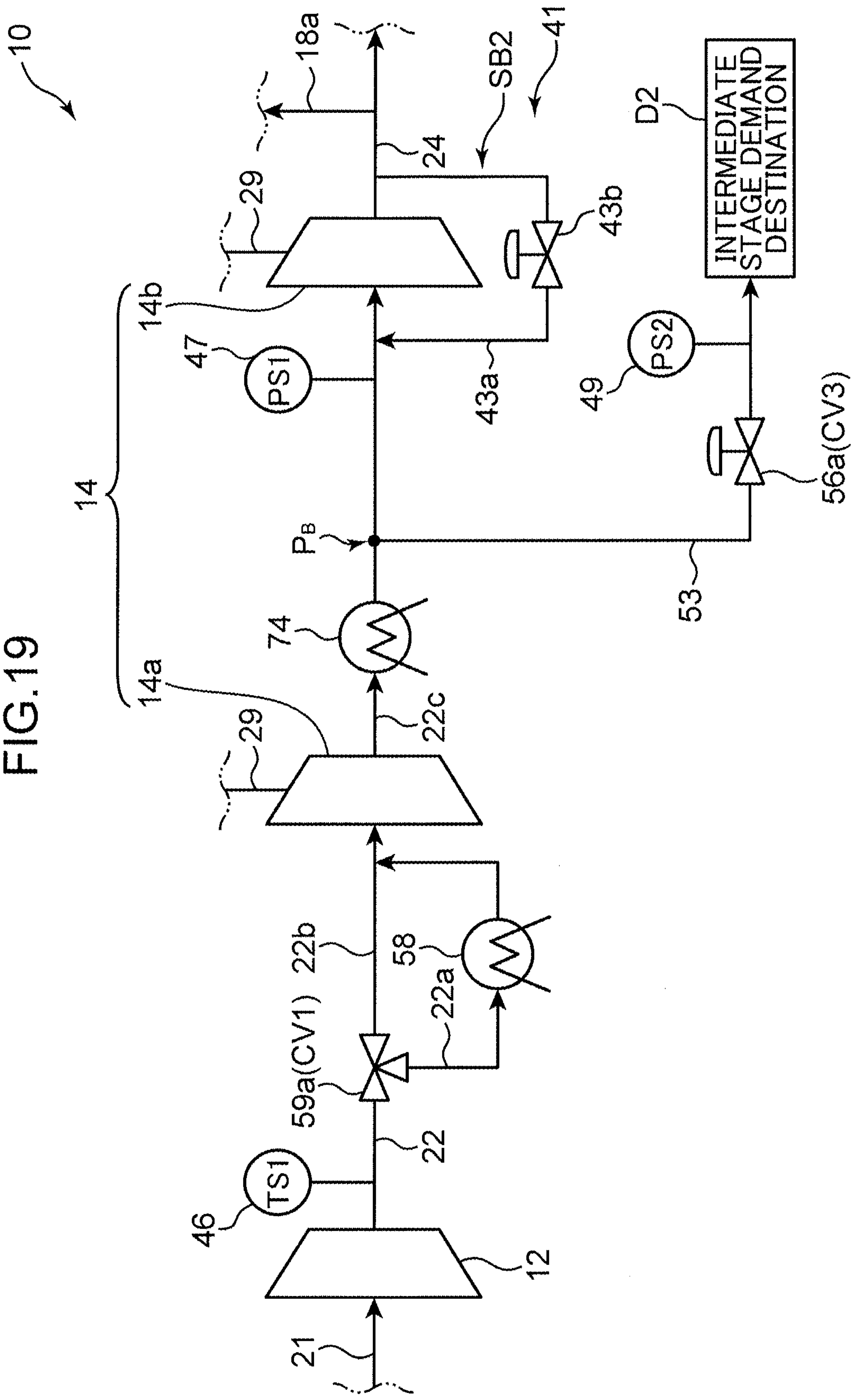
FIG. 19 is a diagram schematically illustrating a partial configuration of the compressor unit according to a variation of the fourth embodiment.

Furthermore, in the compressor unit 10 illustrated in FIGS. 16 to 18, the configuration in which the low pressure gas discharge path 53 is branched from a portion on the upstream side of the succeeding first compression stage 14*a* in the intermediate flow path 22 is employed, but a position of the branch point $P_B$ where the low pressure gas discharge path 53 is branched is not limited to this. For example, as illustrated in FIG. 19, the low pressure gas discharge path 53 may be branched from the branch point $P_B$ arranged in the third flow path 22*c* between the succeeding first compression stage 14*a* and the succeeding second compression stage 14*b* in the intermediate flow path 22. Note that, in the compressor unit 10 illustrated in FIG. 19, as an example, an intermediate cooler 74 may be provided at a portion on the upstream side of the branch point $P_B$ in the third flow path 22*c*. By this, hydrogen gas whose temperature is increased due to compression of the succeeding first compression stage 14*a* can be cooled and sent to the succeeding second compression stage 14*b*. In this case, the adjusting means 41 adjusts a processing amount of hydrogen gas by the compression stage 14*b* on the downstream side of the branch point $P_B$ in two of the compression stages 14*a* and 14*b* constituting the succeeding compression stage.

Note that, in the compressor unit 10 illustrated in each of FIGS. 16 to 19, the leak gas discharge unit 29 is provided in each of the succeeding first compression stage 14*a* and the succeeding second compression stage 14*b* of the succeeding compression stage 14. However, in the compressor unit 10, the leak gas discharge unit 29 may be provided in some of a plurality of compression stages constituting the succeeding compression stage 14.

Fifth Embodiment

Figure 20:
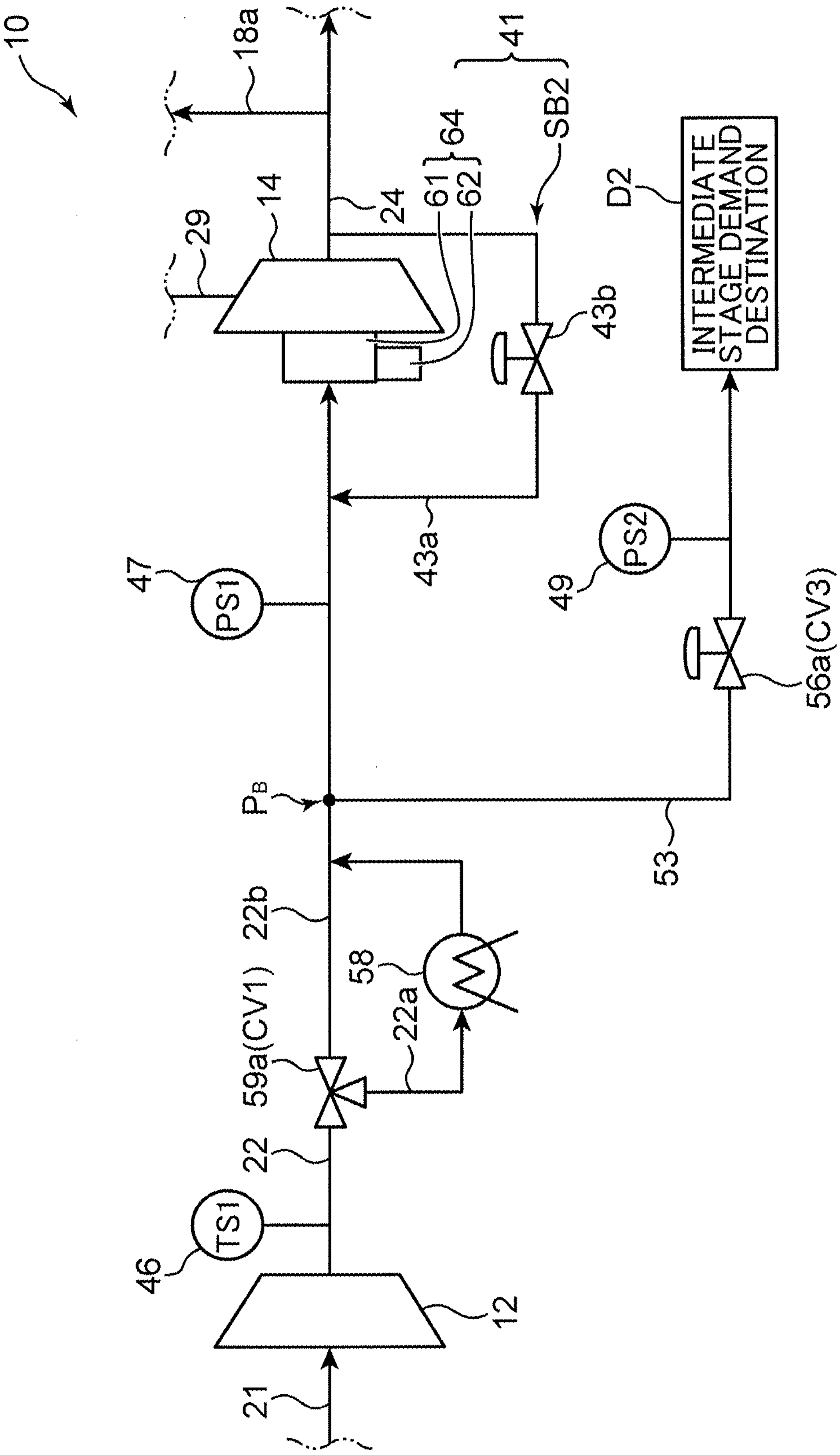
FIG. 20 is a diagram schematically illustrating a partial configuration of the compressor unit according to a fifth embodiment.

As illustrated in FIG. 20, in the compressor unit 10 according to the present embodiment, the adjusting means 41 in which an on-off type suction valve unloader 61 and the second spillback unit SB2 similar to that illustrated in FIG. 19 are used in combination may be employed.

Figure 21:
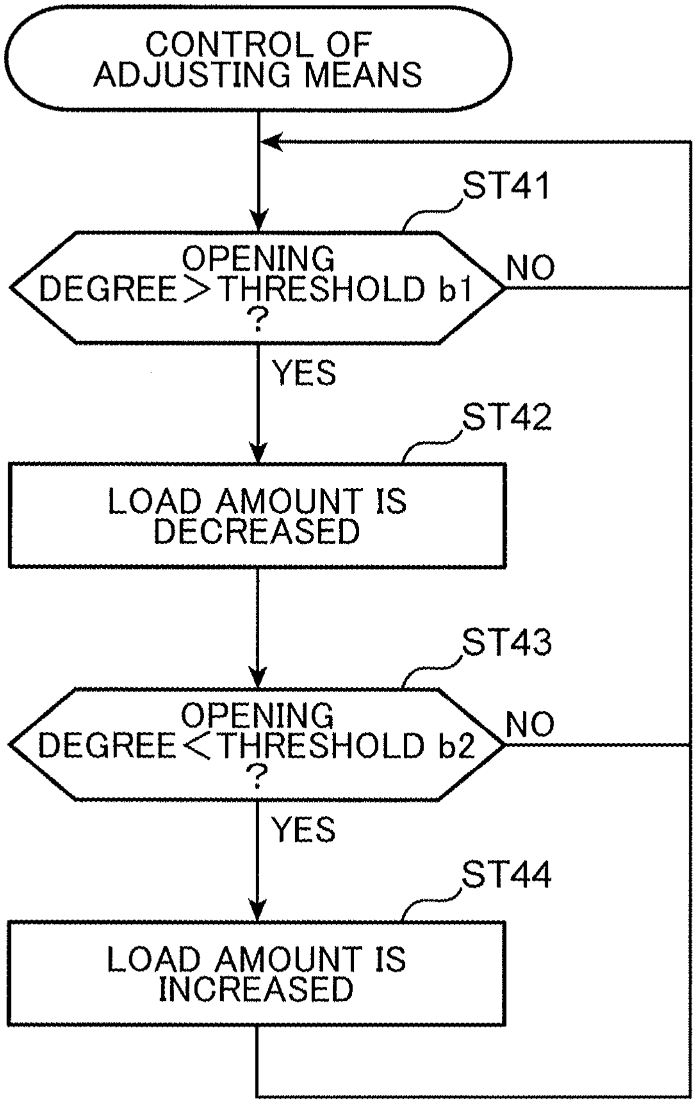
FIG. 21 is a flowchart showing control of an adjusting means in operation control executed by the controller in operation of the compressor unit.

As illustrated in FIG. 21, in control of the adjusting means 41, in a case where the controller 50 determines that a state (valve opening degree) of the second spillback valve 43*b* input to the controller 50 is larger than an opening degree threshold b1 (step ST41: YES), a load amount of the succeeding compression stage 14 is decreased (step ST42). The opening degree threshold b1 is a preset threshold. The case where a state of the second spillback valve 43*b* is larger than the opening degree threshold b1 is a case where a spillback amount is large. The decrease in a load amount of the succeeding compression stage 14 in the case is executed by controlling the suction valve unloader 61. A load amount of the succeeding compression stage 14 is decreased from 100% to 50%, for example.

In a case where the controller 50 determines that opening degree of the second spillback valve 43*b* becomes smaller than an opening degree threshold b2 (step ST43: Yes), control of the suction valve unloader 61 is executed such that a load amount of the succeeding compression stage 14 is increased (for example, from 50% to 100%) (step ST44). This allows reduction in power by decreasing load amount of the succeeding compression stage 14 in a case where a spillback amount is excessive.

Figure 22:
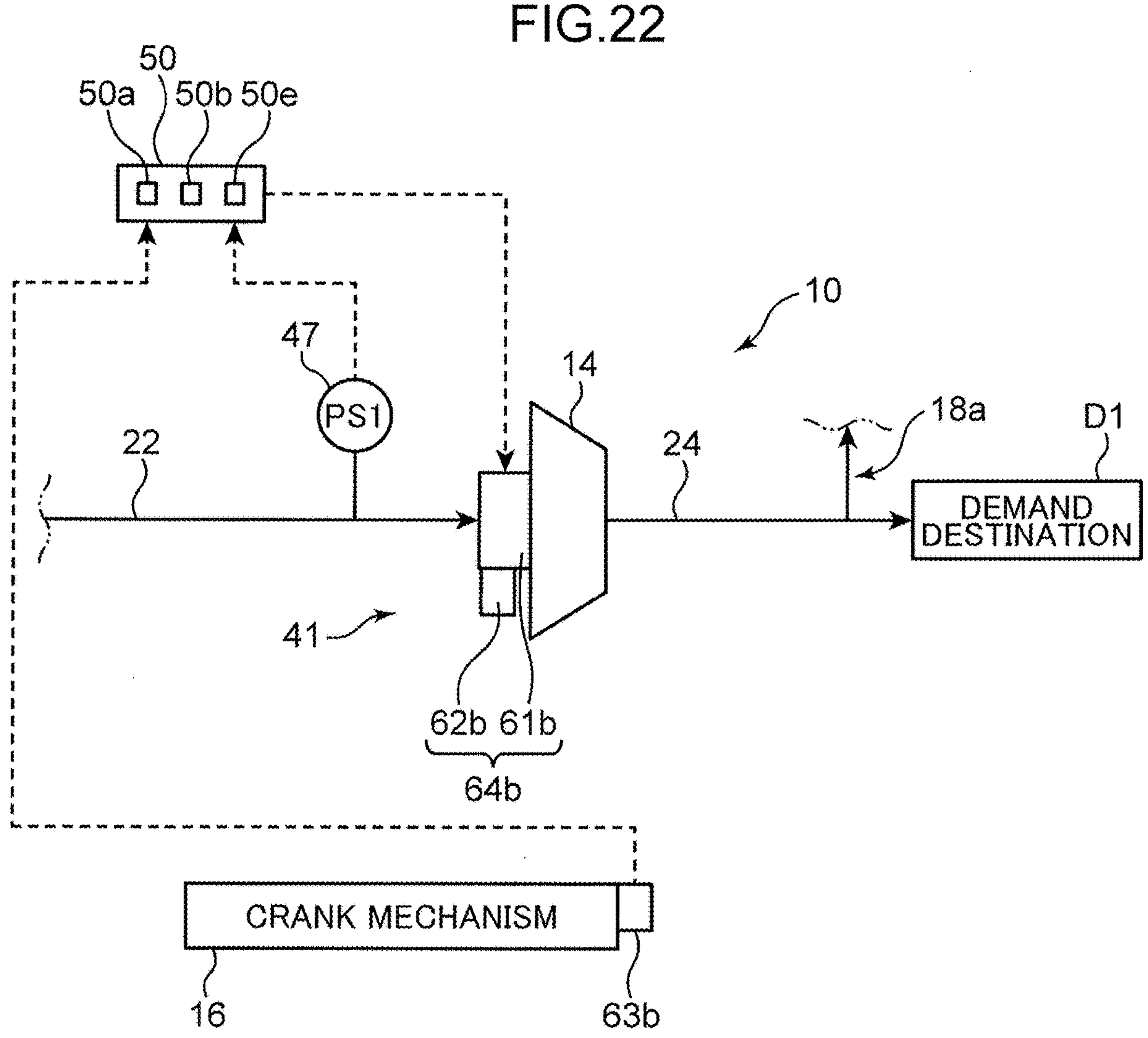
FIG. 22 is a diagram schematically illustrating a partial configuration of the compressor unit according to a variation of the fifth embodiment.

The compressor unit 10 may include a stepless capacity adjustment device 64*b* provided in the succeeding compression stage 14 as the adjusting means 41, as illustrated in FIG. 22.

The stepless capacity adjustment device 64*b* includes a suction valve unloader 61*b*, a drive device 62*b*, and a detector 63*b* that detects rotation of a crank mechanism. The suction valve unloader 61*b* is driven by the hydraulic or electric drive device 62*b*, and can maintain or release an open state of a valve plate of a suction valve at a speed higher than the time required for a piston to reciprocate. Further, the controller performs computational processing to estimate a position of a piston based on a signal transmitted from the detector 63*b* installed in a crank mechanism.

In a cylinder unit of the succeeding compression stage 14, a suction valve installed between a suction passage and a compression chamber includes a valve plate that opens and closes a gas passage, a valve body that houses the valve plate, and the like. The suction valve has a configuration in which, in a similar manner to a check valve, in a case where upstream pressure is higher than downstream pressure, the valve plate becomes in an open state due to the differential pressure, and in a case where the downstream pressure is higher, gas does not flow.

When the suction valve unloader 61*b* is driven, the valve plate of the suction valve is maintained in an open state, and a state in which it cannot function as a check valve is created. Note that in a case where the piston enters a suction stroke in a state where the unloader is not driven, pressure in the compression chamber is lower than that in the suction passage. For this reason, the suction valve becomes in a state of opened, and gas is led into the compression chamber side. In a case where the piston is in a compression stroke, pressure in the compression chamber increases to be more than that in the suction passage. For this reason, the suction valve becomes in a closed state.

The suction valve is maintained in an open state by the stepless capacity adjustment device 64*b* at an initial stage of a compression stroke. In this case, a part of gas led into the compression chamber is returned to the suction passage side. The suction valve is released from the open state from the middle of the compression stroke to be in the closed state. In this case, gas remaining in the compression chamber at the time of the closed state is compressed and delivered. The closed state of the suction valve is released after the drive unit is driven again at the time of a next piston suction stroke and a compression stroke of the piston starts. Opening and closing operation of the suction valve is repeated in accordance with a reciprocating motion of the piston as described above.

A delivery amount increases when the timing of releasing the open state in the suction valve is advanced, and the delivery amount decreases when the timing is delayed. For this reason, the stepless capacity adjustment device 64*b* can perform the same function as the second spillback valve. Furthermore, since an amount of gas to be compressed is adjusted, an effect of reducing power is great.

Other Variations

It should be understood that the embodiment disclosed this time is illustrative in all respects and is not restrictive. The present invention is not limited to the above embodiment, and various changes, improvements, and the like can be made without departing from the gist of the present invention.

Figure 23:
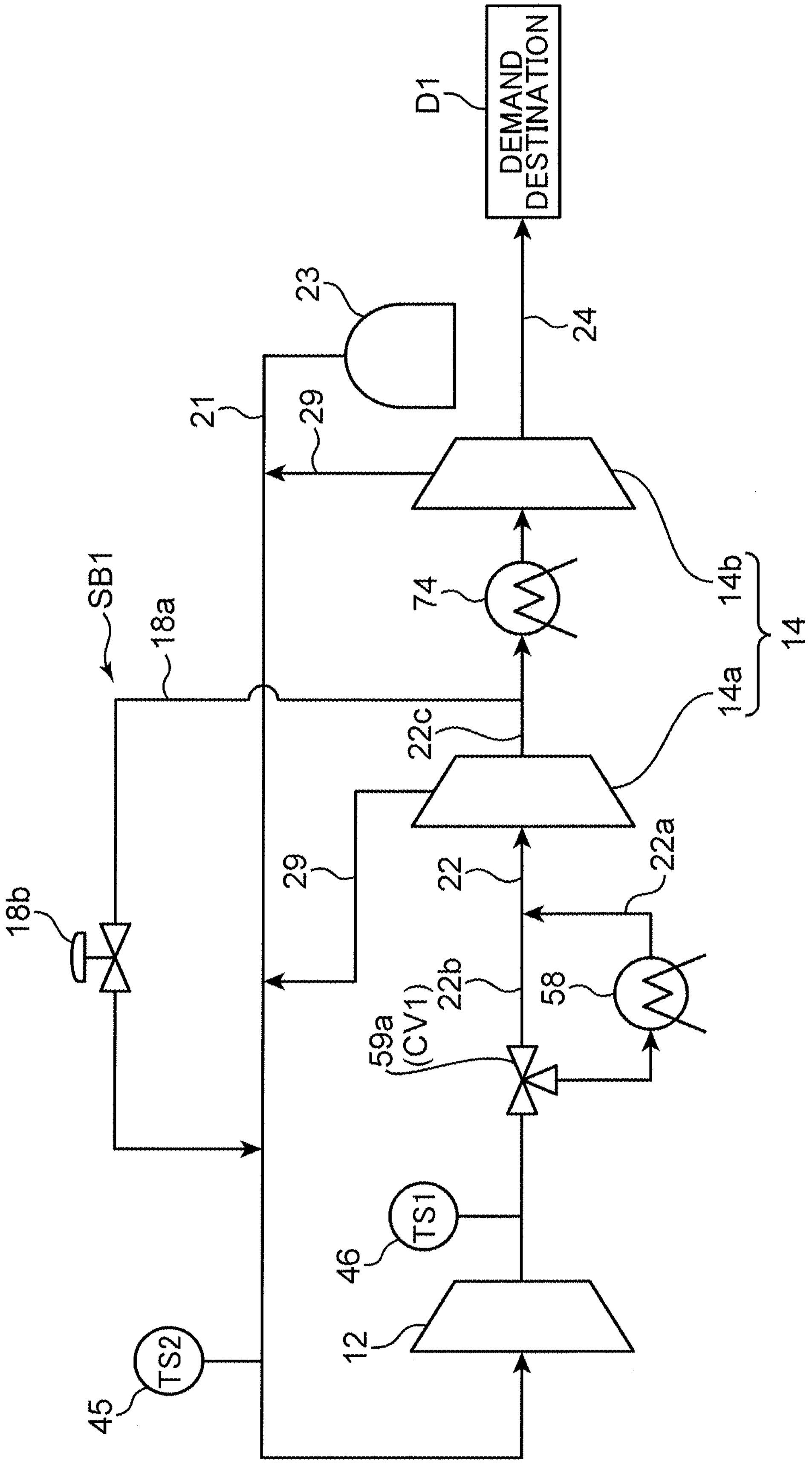
FIG. 23 is a diagram schematically illustrating a partial configuration of the compressor unit according to another variation.

For example, as illustrated in FIG. 23, in the compressor unit 10, the spillback unit SB1 may be configured such that a part of hydrogen gas flowing through the third flow path 22*c* is returned to the suction flow path 21. By this, a part of hydrogen gas flowing between two adjacent ones of the succeeding compression stages 14 (the succeeding first compression stage 14*a* and the succeeding second compression stage 14*b*) in the intermediate flow path 22 can be returned to the suction flow path 21 by the spillback unit SB1. Even in this case, the first compression stage 12 is prevented from being exposed to cryogenic hydrogen gas. In the compressor unit 10, the number of the succeeding compression stages 14 may be three or more, and the spillback unit SB1 may be provided in any intermediate flow path between the succeeding compression stages 14.

Figure 24:
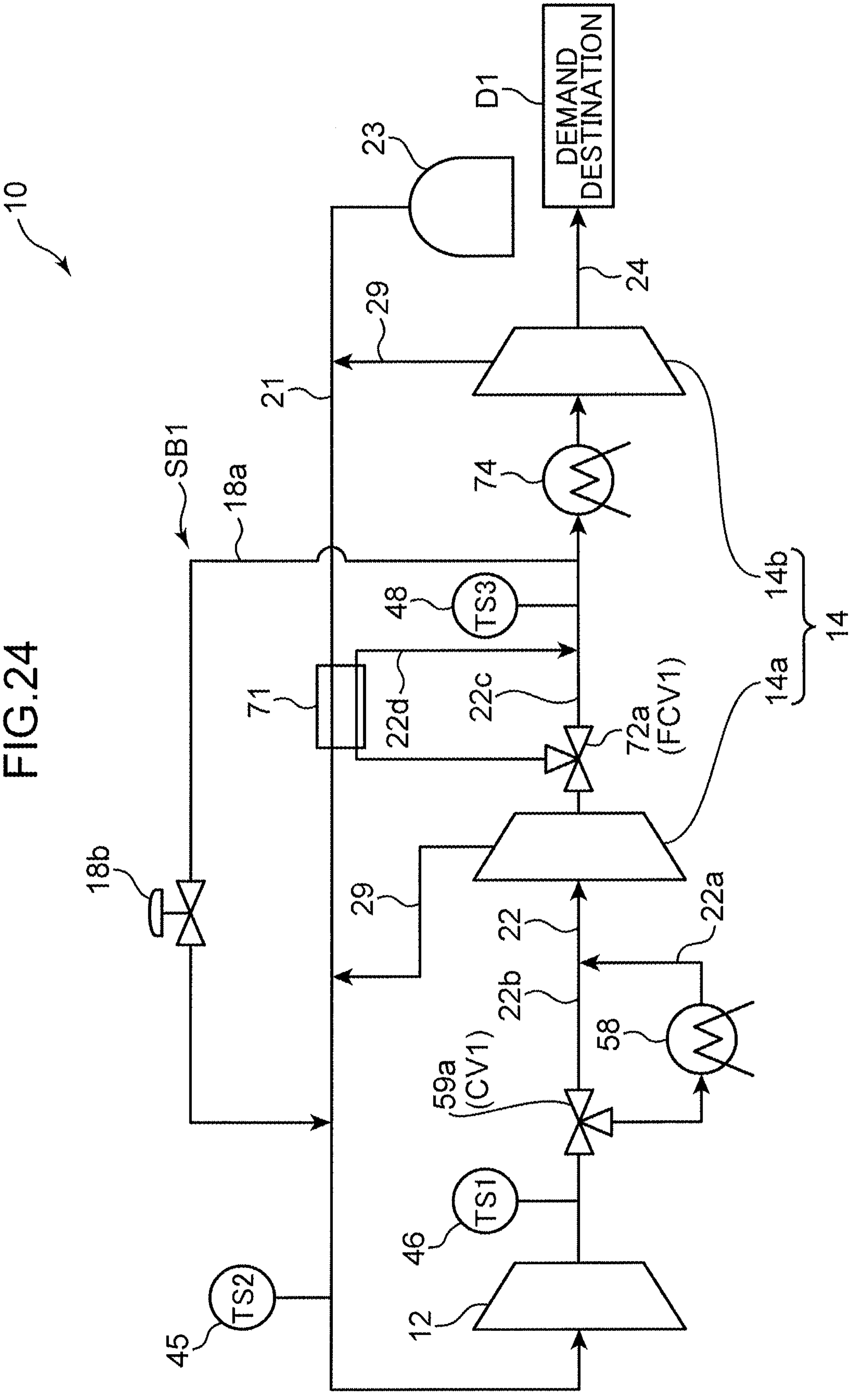
FIG. 24 is a diagram schematically illustrating a partial configuration of the compressor unit according to another variation.

As illustrated in FIG. 24, in the compressor unit 10, intermediate flow path 22 may be provided with the fourth flow path 22*d* that branches separately from the third flow path 22*c*. In this case, the preheater 71 may be arranged so as to exchange heat between hydrogen gas flowing through the suction flow path 21 (hydrogen gas suctioned into the first compression stage 12) and hydrogen gas flowing through the fourth flow path 22*d*. Other configurations are substantially the same as those in FIG. 23. The number of the succeeding compression stages 14 may be three or more, and the preheater 71 may be provided in any optional intermediate flow path between the succeeding compression stages 14.

Summary

A compressor unit according to one aspect of the present invention is a reciprocating compressor unit configured to recover hydrogen gas that is boil-off gas from a liquid hydrogen storage tank and supply at least a portion of the hydrogen gas to a demand destination that includes at least one of an engine, a power generation facility, and a boiler. Then, the compressor unit according to the present aspect includes a plurality of compression stages, a crank mechanism, a cooler, a first switching means, a spillback unit, a first temperature sensor, a second temperature sensor, and a controller.

A plurality of the compression stages are configured to compress hydrogen gas suctioned from a suction flow path. The crank mechanism is configured to drive a plurality of the compression stages. The cooler is arranged in an intermediate flow path between a plurality of the compression stages. The first switching means is configured to switch an inflow state of hydrogen gas into the cooler. The spillback unit includes a spillback flow path and a spillback valve. The spillback flow path being for returning hydrogen gas after being discharged to a discharge flow path on the discharge side of a plurality of the compression stages or hydrogen gas flowing through the intermediate flow path to the suction flow path. The spillback valve is configured to adjust a spillback amount in the spillback flow path. The first temperature sensor is arranged in the intermediate flow path. The second temperature sensor is arranged on the suction flow path between a connection portion of the spillback flow path and a first compression stage as a foremost stage among a plurality of the compression stages. The controller is configured to control each of the first switching means and the spillback valve.

In the compressor unit according to the present aspect, each of the first compression stage and succeeding compression stage excluding the first compression stage among a plurality of the compression stages includes a cylinder unit, a piston, a piston rod, and rod packing. The piston rod connects the piston to the crank mechanism. The rod packing seals between the piston rod and the cylinder unit.

The first compression stage is of an air cooling type and an oil free type.

The controller is configured to control the first switching means and the spillback valve as described below.

The controller controls the first switching means to establish a first switching state in a case where temperature TS1 obtained by the first temperature sensor is equal to or more than a predetermined first temperature threshold T1 higher than 0° C. at time of startup. The first switching state is a state in which hydrogen gas discharged from the first compression stage flow through the cooler to be cooled.

The controller controls the first switching means to be in a second switching state in a case where temperature TS1 obtained by the first temperature sensor is less than the first temperature threshold T1. The second switching state is a state in which hydrogen gas is sent to a compression stage downstream of a portion where the cooler is arranged without passing through the cooler.

The controller refers to suction temperature TS2 obtained by the second temperature sensor and controls the spillback valve such that the suction temperature TS2 falls within a predetermined temperature range in a case where the first switching means is in the second switching state.

In the compressor unit according to the present aspect, the predetermined temperature range is set to a range higher than reference temperature based on liquefaction temperature of air and less than 0° C.

In the above aspect, the compressor unit can be protected in a low temperature environment. More specifically, in a case where hydrogen gas in a piping on the liquid hydrogen storage tank side rises to a positive temperature region at the time of startup, hydrogen gas on the upstream side of a cooler in the intermediate flow path is cooled by the cooler, so that it is possible to prevent hydrogen gas whose temperature excessively rises from being sent to a compression stage (succeeding compression stage) on the downstream side. That is, the succeeding compression stage can be protected in the compressor unit. Further, in the compressor unit, even in a case where the first switching means is in the first switching state at the time of startup, hydrogen gas in the predetermined temperature range is sent to the compression stage on the downstream side, so that the compressor unit can be quickly started up.

Further, in the compressor unit according to the above aspect, in a case where the first switching means is in the second switching state, the suction temperature TS2 of hydrogen gas suctioned into the first compression stage can be adjusted by hydrogen gas returned to the suction flow path by the spillback unit. For this reason, in the compressor unit, by setting a temperature range of hydrogen gas suctioned into the first compression stage to be higher than reference temperature based on liquefaction temperature of air, it is possible to avoid occurrence of liquefaction of oxygen gas as oxidizing gas.

Further, in the compressor unit according to the above aspect, since the first compression stage is of an oil free type, the risk of oil freezing can be avoided.

The compressor unit according to the above aspect may further include a preheater, a third temperature sensor, and a flow rate adjusting means. The preheater is configured to enable heat exchange between hydrogen gas before being suctioned into the first compression stage and hydrogen gas after being discharged to the discharge flow path or hydrogen gas flowing through the intermediate flow path. The third temperature sensor is arranged downstream of the preheater in the discharge flow path. The flow rate adjusting means is configured to adjust an inflow state of hydrogen gas into the preheater.

In a case where the first switching means is in the second switching state, the controller may control the flow rate adjusting means and the spillback valve as described below.

The controller may be configured to control the flow rate adjusting means such that temperature TS3 on the downstream side of the preheater obtained by the third temperature sensor does not become equal to or less than a threshold, while increasing an inflow amount of hydrogen gas into the preheater to prioritize heating of hydrogen gas in the suction flow path by the preheater over heating by the spillback unit in the second switching state.

The controller may be configured to control the flow rate adjusting means and the spillback valve such that the suction temperature TS2 falls within a predetermined temperature range in a case where the suction temperature TS2 is equal to or less than set temperature in the second switching state.

In the compressor unit according to the above aspect, in the second switching state, heating to the suction temperature TS2 by the preheater is prioritized over heating by the spillback unit, and when heating is insufficient, it is compensated for by the preheater. By this, loss of power for returning compressed hydrogen gas to the suction side of the first compression stage can be minimized, and suction temperature of hydrogen gas into the succeeding compression stage can be controlled within a certain range while decrease in processing efficiency is suppressed.

In the compressor unit, a third temperature sensor is arranged downstream of the preheater, and temperature of hydrogen gas on the downstream side of the preheater is controlled by using detected temperature TS3 by the third temperature sensor. This makes it possible to suppress excessive temperature decrease of hydrogen gas.

The compressor unit according to the above aspect may further include a preheater and a third temperature sensor. The preheater is configured to enable heat exchange between hydrogen gas before being suctioned into the first compression stage and hydrogen gas flowing between the first compression stage and the succeeding compression stage in the intermediate flow path. The third temperature sensor is arranged downstream of the preheater in the intermediate flow path.

Further, in the compressor unit according to the above aspect, the first switching means may be configured to switch hydrogen gas discharged from the first compression stage to any of an inflow state of hydrogen gas into the cooler, an inflow state of hydrogen gas directly into the succeeding compression stage, and an inflow state of hydrogen gas into the preheater.

Further, in the compressor unit according to the above aspect, the controller may be configured to control the spillback valve and the first switching means as described below in a case where the first switching means is in the second switching state.

The controller may be configured to control the spillback valve and the first switching means so that hydrogen gas in the suction flow path falls within the predetermined temperature range by using heating of hydrogen gas in the suction flow path by the spillback unit in combination with heating of hydrogen gas by the preheater in the second switching state.

The controller may be configured to control the first switching means so that inflow of hydrogen gas into the preheater is not increased any further in a case where temperature TS3 on the downstream side of the preheater obtained by the third temperature sensor is less than a threshold in the second switching state.

In the compressor unit according to the above aspect, in a case where the first switching means is in the second switching state, heating by the preheater is used in combination in addition to heating of hydrogen gas in the suction flow path by the spillback unit. For this reason, as compared with a case where only heating by the spillback unit is performed, loss of power for returning compressed hydrogen gas to the suction side of the succeeding compression stage can be minimized by using the heating by the preheater in combination. Therefore, in the compressor unit, suction temperature of hydrogen gas into the succeeding compression stage can be controlled to be within a certain range while suppressing decrease in processing efficiency.

In the compressor unit, a third temperature sensor is arranged downstream of the preheater, and temperature on the downstream side of the preheater is controlled by using detected temperature TS3 by the third temperature sensor. By this, in the compressor unit, excessive temperature decrease of hydrogen gas can be suppressed.

The compressor unit according to the above aspect may further include a low pressure gas discharge path, a third switching means, and an adjusting means. The low pressure gas discharge path branches from a branch point on the intermediate flow path and allows hydrogen gas to be discharged to an intermediate stage demand destination that can process hydrogen gas lower than pressure of hydrogen gas required by the demand destination. The third switching means is arranged on the low pressure gas discharge path or the branch point. The adjusting means configured to adjust a processing amount of hydrogen gas by the succeeding compression stage.

In the compressor unit according to the above aspect, the controller may be configured to control the adjusting means so that a processing amount of the succeeding compression stage is adjusted while controlling the third switching means so that hydrogen gas is discharged to the low pressure gas discharge path according to a change in a required amount of the demand destination or a required amount of the intermediate stage demand destination in parallel with control of the spillback valve in a case where the first switching means is in the second switching state.

In the compressor unit according to the above aspect, by discharging hydrogen gas to the intermediate stage demand destination in a case where a necessary amount (required amount) at the demand destination is reduced, an amount of boil-off gas (hydrogen gas) generated from the liquid hydrogen storage tank and an amount of hydrogen gas delivered by the first compression stage can be balanced. By this, in the compressor unit, pressure of the liquid hydrogen storage tank can be kept constant.

Further, in the compressor unit, a processing amount of hydrogen gas in the succeeding compression stage is reduced by the adjusting means, so that a compression ratio of the succeeding compression stage can be suppressed. By this, in the compressor unit, a processing amount of hydrogen gas in the succeeding compression stage can be reduced, and power of the succeeding compression stage can be reduced.

In the compressor unit according to the above aspect, the succeeding compression stage may include two or more compression stages. Further, the compressor unit according to the above aspect may further include a low pressure gas discharge path, a third switching means, and an adjusting means. The low pressure gas discharge path branches from a branch point provided in the intermediate flow path and allows hydrogen gas to be discharged to an intermediate stage demand destination that can process hydrogen gas lower than pressure of hydrogen gas required by the demand destination. The third switching means is arranged in the low pressure gas discharge path or the branch point. The adjusting means is configured to adjust a processing amount of hydrogen gas by a compression stage on the downstream side of the branch point among the two or more compression stages constituting the succeeding compression stage.

In the compressor unit according to the above aspect, the controller may be configured to control the adjusting means so that a processing amount of the compression stage on the downstream side of the succeeding compression stage is adjusted while controlling the third switching means so that hydrogen gas is discharged to the low pressure gas discharge path according to a change in a required amount of the demand destination or a required amount of the intermediate stage demand destination in parallel with control of the spillback valve in a case where the first switching means is in the second switching state.

In the compressor unit according to the above aspect, by discharging hydrogen gas to the intermediate stage demand destination in a case where a necessary amount (required amount) at the demand destination is reduced, an amount of boil-off gas (hydrogen gas) generated from the liquid hydrogen storage tank and an amount of hydrogen gas delivered by the first compression stage can be balanced. Therefore, in the compressor unit, pressure of the liquid hydrogen storage tank can be kept constant.

Further, in the compressor unit, an amount of hydrogen gas to the compression stage on the downstream side can be reduced by the adjusting means. As a result, in the compressor unit, by suppressing a compression ratio of the compression stage on the downstream side in the succeeding compression stage, a processing amount of hydrogen gas in the compression stage can be reduced, and power of the compression stage can be reduced.

In the compressor unit according to the above aspect, the adjusting means may include a second spillback unit. The second spillback unit includes a second spillback flow path and a second spillback valve. The second spillback flow path is for returning hydrogen gas to the suction side of the succeeding compression stage on the upstream side of the spillback flow path. The second spillback valve is for adjusting a spillback amount in the second spillback flow path.

In the compressor unit according to the present aspect, the controller may be configured to control the second spillback valve such that a flow rate corresponding to the change in a required amount of the demand destination or the required amount of the intermediate stage demand destination is returned to the suction side of the succeeding compression stage by the second spillback unit in a case where the first switching means is in the second switching state.

In the compressor unit according to the above aspect, an amount of hydrogen gas to be returned to the suction side of the succeeding compression stage by the second spillback unit can be reduced in a case where a necessary amount (required amount) at the demand destination is reduced. By this, in the compressor unit, while an amount of boil-off gas (hydrogen gas) generated from the liquid hydrogen storage tank and an amount of hydrogen gas delivered by the first compression stage are balanced, a processing amount of hydrogen gas in the succeeding compression stage can be reduced and power of the succeeding compression stage can be reduced.

In the compressor unit according to the above aspect, the adjusting means may further include an on-off type suction valve unloader mounted on a cylinder unit of the succeeding compression stage.

In the compressor unit according to the above aspect, the controller may be configured to control the suction valve unloader as described below in a case where the first switching means is in the second switching state.

The controller may control the suction valve unloader so that a load amount of the succeeding compression stage is decreased by control of the suction valve unloader in a case where opening degree of the second spillback valve is larger than an opening degree threshold b1 set in advance in the second switching state.

The controller may control the suction valve unloader such that a load amount of the succeeding compression stage is increased in a case where opening degree of the second spillback valve is smaller than an opening degree threshold b2 in the second switching state.

Since the compressor unit according to the above aspect includes the second spillback unit, hydrogen gas after compression is returned to the suction side of the succeeding compression stage by the second spillback unit even in a case where a required amount of the high pressure demand destination (D1) decreases. By this, in the compressor unit, suction pressure of the succeeding compression stage can be kept substantially constant. Therefore, in the compressor unit according to the above aspect, pressure balance of each stage of the succeeding compression stage can be kept constant at all times, and high reliability of the compressor is achieved.

In the compressor unit according to the above aspect, the adjusting means may include a suction valve unloader, a drive device, and a stepless capacity adjustment device. The suction valve unloader is mounted on a cylinder unit of the succeeding compression stage. The drive device is of a hydraulic or electric type, and configured to open and close the suction valve unloader. The stepless capacity adjustment device includes a control device configured to control the timing of operation of the suction valve unloader in conjunction with rotational motion of a crankshaft.

In the compressor unit according to the above aspect, the controller may be configured to control the capacity adjustment device so that a processing amount of the succeeding compression stage is adjusted so that hydrogen gas suctioned to the suction side from the inside of the cylinder unit is returned according to a flow rate corresponding to the change in a required amount of the demand destination or the required amount of the intermediate stage demand destination in a case where the first switching means is in the second switching state.

In the compressor unit according to the above aspect, in the second switching state, the operation timing and operation time of the suction valve unloader are controlled, and a part of hydrogen gas in the cylinder unit is returned to the suction side. For this reason, in the compressor unit, a processing amount of hydrogen gas in the succeeding compression stage can be reduced, and power can be further reduced.

In the compressor unit according to the above aspect, at least a part of the succeeding compression stage may include a leak gas discharge unit configured to return leak gas from rod packing to the suction flow path.

In the compressor unit, pressure becomes higher in a succeeding compression stage, and hydrogen gas becomes more likely to leak, but in the compressor unit according to the above aspect, hydrogen gas leaking in the succeeding compression stage is recovered into the suction flow path side by the leak gas discharge unit. For this reason, in the compressor unit according to the above aspect, loss of product gas (hydrogen gas) during compression can be reduced.

As described above, the compressor unit according to each of the above aspects can appropriately protect its constituent device from a wide range of temperature variations of boil-off gas of the liquefied hydrogen.

The invention claimed is:

1. A compressor unit that is a reciprocating compressor unit that recovers hydrogen gas that is boil-off gas from a liquid hydrogen storage tank and supplies at least a part of the hydrogen gas to a demand destination that includes at least one of an engine, a power generation facility and a boiler, the compressor unit comprising:

- a plurality of compression stages configured to compress hydrogen gas suctioned from a suction flow path;
- a crank mechanism configured to drive the plurality of compression stages;
- a cooler arranged in an intermediate flow path between the plurality of compression stages;
- a first switcher configured to switch an inflow state of hydrogen gas into the cooler;

a spillback unit including a spillback flow path for returning hydrogen gas after being discharged to a discharge flow path on a discharge side of the plurality of compression stages or hydrogen gas flowing through the intermediate flow path to the suction flow path, and a spillback valve that adjusts a spillback amount in the spillback flow path;

a first temperature sensor arranged in the intermediate flow path;

a second temperature sensor arranged between a connection portion of the spillback flow path and a first compression stage as a foremost stage among the plurality of compression stages in the suction flow path; and a controller configured to control each of the first switcher and the spillback valve, wherein each of the first compression stage and succeeding compression stages excluding the first compression stage among the plurality of compression stages includes:

a cylinder unit;

a piston;

a piston rod connecting the piston to the crank mechanism; and rod packing that seals between the piston rod and the cylinder unit, the first compression stage is of an air cooling type and an oil free type, wherein the controller is configured to:

control the first switcher to establish a first switching state in which hydrogen gas discharged from the first compression stage is caused to flow through the cooler to be cooled at time of startup and in a case where temperature TS1 obtained by the first temperature sensor is equal to or more than a predetermined first temperature threshold T1 higher than 0° C., control the first switcher to establish a second switching state in which hydrogen gas is sent to a compression stage downstream of a portion where the cooler is arranged without passing through the cooler in a case where the temperature TS1 obtained by the first temperature sensor becomes less than the first temperature threshold T1, and refer to suction temperature TS2 obtained by the second temperature sensor and control the spillback valve such that the suction temperature TS2 falls within a predetermined temperature range in a case where the first switcher is in the second switching state, and the predetermined temperature range is set to a range higher than a reference temperature based on liquefaction temperature of air and less than 0° C.

2. The compressor unit according to claim 1, further comprising:

a preheater configured to enable heat exchange between hydrogen gas before being suctioned into the first compression stage and hydrogen gas after being discharged into the discharge flow path or hydrogen gas flowing through the intermediate flow path;

a third temperature sensor arranged downstream of the preheater in the discharge flow path; and a flow rate adjuster configured to adjust an inflow state of hydrogen gas into the preheater, wherein the controller is configured to:

when the first switcher is in the second switching state, control the flow rate adjuster such that temperature TS3 on a downstream side of the preheater obtained by the third temperature sensor does not become equal to or less than a threshold, while increasing an inflow amount of hydrogen gas into the preheater to prioritize heating of hydrogen gas in the suction flow path by the preheater over heating by the spillback unit, and control the flow rate adjuster and the spillback valve such that the suction temperature TS2 falls within a predetermined temperature range in a case where the suction temperature TS2 is equal to or less than a set temperature.

3. The compressor unit according to claim 1, further comprising:

a preheater configured to enable heat exchange between hydrogen gas before being suctioned into the first compression stage and hydrogen gas flowing between the first compression stage and the succeeding compression stage in the intermediate flow path; and a third temperature sensor arranged downstream of the preheater in the intermediate flow path, wherein the first switcher is configured to switch hydrogen gas discharged from the first compression stage to any of an inflow state of hydrogen gas into the cooler, an inflow state of hydrogen gas directly into the succeeding compression stage, and an inflow state of hydrogen gas into the preheater, wherein the controller is configured to:

control the spillback valve and the first switcher so that hydrogen gas in the suction flow path falls within the predetermined temperature range by using heating of hydrogen gas in the suction flow path by the spillback unit in combination with heating of hydrogen gas by the preheater in a case where the first switcher is in the second switching state, and control the first switcher so that inflow of hydrogen gas into the preheater is not increased any further in a case where temperature TS3 on a downstream side of the preheater obtained by the third temperature sensor is less than a threshold.

4. The compressor unit according to claim 1, further comprising:

a low pressure gas discharge path that branches from a branch point provided in the intermediate flow path and through which hydrogen gas can be discharged to an intermediate stage demand destination that can process hydrogen gas lower than pressure of hydrogen gas required by the demand destination; and a third switcher arranged in the low pressure gas discharge path or the branch point; and an adjuster configured to adjust a processing amount of hydrogen gas by the succeeding compression stage, wherein the controller is configured to control the adjuster so that a processing amount of the succeeding compression stage is adjusted while controlling the third switcher so that hydrogen gas is discharged to the low pressure gas discharge path according to a change in a required amount of the demand destination or a required amount of the intermediate stage demand destination in parallel with control of the spillback valve in a case where the first switcher is in the second switching state.

5. The compressor unit according to claim 1, wherein the succeeding compression stages include two or more compression stages, the compressor unit further comprising:

a low pressure gas discharge path that branches from a branch point provided in the intermediate flow path and through which hydrogen gas can be discharged to an intermediate stage demand destination that can process hydrogen gas lower than pressure of hydrogen gas required by the demand destination;

a third switcher arranged in the low pressure gas discharge path or the branch point; and an adjuster configured to adjust a processing amount of hydrogen gas by a compression stage on a downstream side of the branch point among the two or more compression stages constituting the succeeding compression stages, wherein the controller is configured to control the adjuster so that a processing amount of the compression stage on the downstream side in the succeeding compression stages is adjusted while controlling the third switcher so that hydrogen gas is discharged to the low pressure gas discharge path according to a change in a required amount of the demand destination or a required amount of the intermediate stage demand destination in parallel with control of the spillback valve in a case where the first switching means is in the second switching state.

6. The compressor unit according to claim 4, wherein the adjuster includes:

a second spillback unit including a second spillback flow path for returning hydrogen gas to a suction side of the succeeding compression stage on an upstream side of the spillback flow path, and a second spillback valve for adjusting a spillback amount in the second spillback flow path, wherein the controller is configured to control the second spillback valve such that a flow rate corresponding to the change in a required amount of the demand destination or the required amount of the intermediate stage demand destination is returned to a suction side of the succeeding compression stage by the second spillback unit in a case where the first switcher is in the second switching state.

7. The compressor unit according to claim 6, wherein the adjuster further includes:

an on-off type suction valve unloader mounted on a cylinder unit of the succeeding compression stage, wherein the controller is configured to control so that a load amount of the succeeding compression stage is decreased by control of the suction valve unloader in a case where opening degree of the second spillback valve is larger than an opening degree threshold b1 set in advance, and a load amount of the succeeding compression stage is increased by control of the suction valve unloader in a case where opening degree of the second spillback valve is smaller than an opening degree threshold b2 in a case where the first switcher is in the second switching state.

8. The compressor unit according to claim 4, wherein the adjuster includes:

a suction valve unloader mounted on a cylinder unit of the succeeding compression stage;

a hydraulic or electric drive device is configured to open and close the suction valve unloader; and a stepless capacity adjustment device including a control device that controls a timing of operation of the suction valve unloader in conjunction with rotational motion of a crankshaft, wherein the controller is configured to adjust a processing amount of the succeeding compression stage by controlling the capacity adjustment device so that hydrogen gas suctioned to a suction side from an inside of the cylinder unit is returned according to a flow rate corresponding to the change in a required amount of the demand destination or the required amount of the intermediate stage demand destination in a case where the first switcher is in the second switching state.

9. The compressor unit according to claim 1, wherein at least a part of the succeeding compression stage has a leak gas discharge unit that returns leak gas from rod packing to the suction flow path.

10. The compressor unit according to claim 5, wherein the adjuster includes:

a second spillback unit including a second spillback flow path for returning hydrogen gas to a suction side of the succeeding compression stage on an upstream side of the spillback flow path, and a second spillback valve for adjusting a spillback amount in the second spillback flow path, wherein the controller is configured to control the second spillback valve such that a flow rate corresponding to the change in a required amount of the demand destination or the required amount of the intermediate stage demand destination is returned to a suction side of the succeeding compression stage by the second spillback unit in a case where the first switcher is in the second switching state.

11. The compressor unit according to claim 10, wherein the adjuster further includes:

an on-off type suction valve unloader mounted on a cylinder unit of the succeeding compression stage, wherein the controller is configured to control so that a load amount of the succeeding compression stage is decreased by control of the suction valve unloader in a case where opening degree of the second spillback valve is larger than an opening degree threshold b1 set in advance, and a load amount of the succeeding compression stage is increased by control of the suction valve unloader in a case where opening degree of the second spillback valve is smaller than an opening degree threshold b2 in a case where the first switcher is in the second switching state.

12. The compressor unit according to claim 5, wherein the adjuster includes:

a suction valve unloader mounted on a cylinder unit of the succeeding compression stage;

a hydraulic or electric drive device is configured to open and close the suction valve unloader; and a stepless capacity adjustment device including a control device that controls a timing of operation of the suction valve unloader in conjunction with rotational motion of a crankshaft, wherein the controller is configured to adjust a processing amount of the succeeding compression stage by controlling the capacity adjustment device so that hydrogen gas suctioned to a suction side from an inside of the cylinder unit is returned according to a flow rate corresponding to the change in a required amount of the demand destination or the required amount of the intermediate stage demand destination in a case where the first switcher is in the second switching state.

* * * * *